US010211675B2

(12) United States Patent
Hada et al.

(10) Patent No.: US 10,211,675 B2
(45) Date of Patent: Feb. 19, 2019

(54) WIRELESS POWER FEEDING SYSTEM, METHOD OF CONTROLLING THE SAME, PROGRAM, AND STORAGE MEDIUM

(71) Applicant: CANON KABUSHIKI KAISHA, Tokyo (JP)

(72) Inventors: Manabu Hada, Kawasaki (JP); Minoru Akazawa, Abiko (JP); Keisuke Kitajima, Nagareyama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 265 days.

(21) Appl. No.: 14/910,443

(22) PCT Filed: Sep. 12, 2014

(86) PCT No.: PCT/JP2014/074766
§ 371 (c)(1),
(2) Date: Feb. 5, 2016

(87) PCT Pub. No.: WO2015/041308
PCT Pub. Date: Mar. 26, 2015

(65) Prior Publication Data
US 2016/0197488 A1 Jul. 7, 2016

(30) Foreign Application Priority Data

Sep. 18, 2013 (JP) ................. 2013-193185

(51) Int. Cl.
*H02J 5/00* (2016.01)
*H02J 50/10* (2016.01)
(Continued)

(52) U.S. Cl.
CPC ............ *H02J 50/10* (2016.02); *H02J 5/005* (2013.01); *H02J 7/025* (2013.01); *H02J 17/00* (2013.01);
(Continued)

(58) Field of Classification Search
CPC .. H02J 50/10; H02J 50/80; H02J 50/40; H02J 5/005; H02J 7/025; H02J 17/00; H02J 50/90
(Continued)

(56) References Cited

U.S. PATENT DOCUMENTS 6,178,323 B1 1/2001 Nagata
6,804,209 B1 10/2004 Sugaya et al.
(Continued)

FOREIGN PATENT DOCUMENTS

EP 0998154 A2 5/2000
JP H11146030 A 5/1999
(Continued)

OTHER PUBLICATIONS

Office Action issued in Japanese Appln. No. 2013-193185 dated Aug. 1, 2017.
(Continued)

*Primary Examiner* — Dinh T Le
(74) *Attorney, Agent, or Firm* — Rossi, Kimms & McDowell LLP

(57) ABSTRACT

A method of determining a power transmission device to be set as a master device such that wasteful communication is not caused. In a wireless power feeding system, a power transmission device that transmits electric power to a power reception device forms a group with other power transmission devices. The power transmission device performs communication with the power reception device or the other power transmission devices using a wireless transmission section and a wireless reception section, and exchanges information with the other power transmission devices. The power transmission device receives a setting for determining a power transmission device to be set as a master device out of the self device and the other power transmission devices, with which information has been exchanged. If the received setting is for setting the self device as the master device, the self device is set as the master device.

3 Claims, 20 Drawing Sheets

(51) Int. Cl.
*H02J 7/02* (2016.01)
*H02J 50/40* (2016.01)
*H02J 17/00* (2006.01)
*H02J 50/80* (2016.01)
*H02J 50/90* (2016.01)

(52) U.S. Cl.
CPC .............. *H02J 50/40* (2016.02); *H02J 50/80* (2016.02); *H02J 50/90* (2016.02)

(58) Field of Classification Search
USPC ........................................................ 307/104
See application file for complete search history.

(56) References Cited

U.S. PATENT DOCUMENTS

| | | | |
|---|---|---|---|
| 9,203,244 | B2 | 12/2015 | Abe |
| 9,953,763 | B2* | 4/2018 | Uchida ................. H01F 38/14 |
| 2009/0140690 | A1 | 6/2009 | Jung |
| 2009/0264069 | A1 | 10/2009 | Yamasuge |
| 2012/0098485 | A1 | 4/2012 | Kang et al. |
| 2016/0043555 | A1* | 2/2016 | Howell ................... G06F 1/263 307/23 |

FOREIGN PATENT DOCUMENTS

| | | |
|---|---|---|
| JP | 2000138685 A | 5/2000 |
| JP | 2002101166 A | 4/2002 |
| JP | 2003158766 A | 5/2003 |
| JP | 2009136132 A | 6/2009 |
| JP | 2009261157 A | 11/2009 |
| JP | 2010258595 A | 11/2010 |
| JP | 2011211874 A | 10/2011 |
| JP | 2012005207 A | 1/2012 |

OTHER PUBLICATIONS

International Search Report issued in counterpart application No. PCT/JP2014/074766, dated Dec. 22, 2014. Form PCT/ISA/210.
Written Opinion issued in counterpart application No. PCT/JP2014/074766, dated Dec. 22, 2014. Form PCT/ISA/237.

* cited by examiner

FIG. 14

| ID | LOCATION (xi,yi,zi) | POWER TRANSMITTABLE DISTANCE | COMMUNICATABLE DISTANCE | DISTANCE Li |
|---|---|---|---|---|
| 10a | (10,20,30) | 4 | 8 | 5 |
| 10c | (20,25,30) | 4 | 8 | 7.07 |

FIG. 15

| ID | NUMBER OF COMMUNICATABLE POWER TRANSMISSION DEVICES (SNi) |
|---|---|
| 10b | 2 |
| 10a | 1 |
| 10c | 1 |

FIG. 19

| ID | LOCATION $(x_i, y_i, z_i)$ | POWER TRANSMITTABLE DISTANCE | COMMUNICATABLE DISTANCE | DISTANCE $L_i$ |
|---|---|---|---|---|
| 10a | (10,20,30) | 4 | 8 | 5 |
| 10c | (20,25,30) | 4 | 12 | 7.07 |

FIG. 21

| ID | RANDOM NUMBER RNi |
|---|---|
| 10a | 12345 |
| 10c | 6789 |

WIRELESS POWER FEEDING SYSTEM, METHOD OF CONTROLLING THE SAME, PROGRAM, AND STORAGE MEDIUM

TECHNICAL FIELD

The present invention relates to a wireless power feeding system, a method of controlling the same, a program, and a storage medium, and more particularly to a method of establishing a master-slave relationship in the wireless power feeding system.

BACKGROUND ART

There have been proposed four systems for contactlessly (wirelessly) supplying electric power: an inductive coupling system, a magnetic field resonance system, an electric field coupling system, and a radio wave receiving system. In recent years, of these four systems, the magnetic field resonance system has come to draw attention which features a capability of sufficient electric power transmission and a long power transmission distance. As the magnetic field resonance system, there has been proposed a one-to-N power feeding system in which a power transmission device transmits power to a plurality of wireless power reception devices by making use of the feature of the long power transmission distance (see, for example, PTL 1).

In PTL 1, the power transmission device searches for wireless power reception devices in proximity within a few meters of the power transmission device, by transmitting a predetermined pulse signal in a standby mode in which the power transmission device does not feed power. When a wireless power reception device transmits a unique ID thereof to the power transmission device, the power transmission device determines whether or not the wireless power reception device is an object to which power is to be fed. If it is determined that the wireless power reception device is an object to which power is to be fed, the power transmission device transmits electric power to the wireless power reception device. At this time, the power transmission device can transmit a unique code to the wireless power reception device so as to receive information on the amount of charge, an operating state, and so forth, on a device-by-device basis.

Further, to develop the one-to-N power feeding system, standardization of the specifications of an N-to-N wireless power feeding system in which a plurality of power transmission devices transmit electric power to a plurality of wireless power reception devices is in progress. For example, there has been published NPTL 1 (see NPTL 1). According to NPTL 1, a specification is defined such that a group is formed by a plurality of power transmission devices, and one of the power transmission devices in the group is set as a master device for controlling the overall power transmission and communication in the group.

Further, PTL 2 mentioned below proposes a system in which a plurality of power transmission devices are combined, and operate as one consolidated system.

CITATION LIST

Patent Literature

PTL 1: Japanese Patent Laid-Open Publication No. 2009-136132

PTL 2: Japanese Patent Laid-Open Publication No. 2011-211874

Non Patent Literature

NPTL 1: "Wireless Power Transfer—multiple sources control management" ITC 100, October 2012

SUMMARY OF INVENTION

Technical Problem

In a wireless power feeding system in which a plurality of power transmission devices exist, if the plurality of power transmission devices simultaneously transmit electric power to a wireless power reception device (hereinafter also referred to as the "power reception device") which exists in an area on which power feeding areas of the plurality of power transmission devices overlap, radios interferes with one another, which may degrade power feeding efficiency. Therefore, it is necessary to provide a device which plays the role of a controller that performs power feeding control of the whole system, by determining which of the power transmission devices is to feed power to which of the power reception devices, so as to enable each power transmission device to transmit electric power to a power reception device existing in an area where a plurality of power feeding areas overlap, without causing interference of radios from power transmission devices.

To this end, the present invention provides a method of determining a power transmission device to be set as a master device in the group, in a case where a plurality of power transmission devices are disposed in a wireless power feeding system.

Further, in a case where a power transmission device set as the master device has the lowest throughput and specifications in the group, this sometimes produces a power transmission device which cannot make full use of its capabilities. Further, this sometimes causes reduction of total processing speed of the system. Furthermore, this sometimes makes a new function unusable, reduces the number of power reception devices to which power can be originally fed, or causes like other inconveniences.

To solve this problem, the present invention provides a master determination method that makes it possible to set a more efficient power transmission device as the master device when constructing the wireless power feeding system.

Further, in a case where a power transmission device which has just been powered on is set as the master device, it is necessary to collect all information on the power transmission devices forming the wireless power feeding system and the power reception devices existing in power feeding areas, from the beginning, and hence transfer of a larger amount of information occurs between the power transmission devices within the system, and between the power transmission devices and the power reception devices.

To cope with this, the present invention provides a method of determining a power transmission device as the master device, such that that transfer of information is reduced as much as possible when constructing the system.

Further, in a case where the power transmission device which is set as the master device is at an outermost location in the group, and cannot communicate with all of the power transmission devices in the group due to a narrow communication area thereof, the following problem is caused:

When a power transmission device which is set as a slave notifies information to the power transmission device as the master, a power transmission device existing between the master device and the slave device is required to relay this information, which causes wasteful communication.

To solve this problem, the present invention provides a method of determining a power transmission device to be set as a master device such that wasteful communication is not caused.

Solution to Problem

Accordingly, in a first aspect of the present invention, there is provided a wireless power feeding system for supplying electric power to a power reception device, in which a power transmission device that transmits electric power forms a group in cooperation with at least one other power transmission device, wherein the power transmission device comprises a power transmission unit configured to transmit electric power to the power reception device, a communication unit configured to perform communication with the power reception device or the at least one other power transmission device, an information exchanging unit configured to exchange information with any of the at least one other power transmission device, with which the communication unit can perform communication, an input unit configured to receive a setting for determining a power transmission device to be set as a master device out of the self device and any of the at least one other power transmission device, with which the information exchanging unit has exchanged information, and a determination unit configured to determine the self device as the power transmission device to be set as the master device, in a case where the setting received by the input unit is a setting for determining the self device as the master device.

Accordingly, in a second aspect of the present invention, there is provided a wireless power feeding system for supplying electric power to a power reception device, in which a power transmission device that transmits electric power forms a group in cooperation with at least one other power transmission device, wherein the power transmission device comprises a power transmission unit configured to transmit electric power to the power reception device, a communication unit configured to perform communication with the power reception device or the at least one other power transmission device, an information exchanging unit configured to exchange information with any of the at least one other power transmission device, with which the communication unit can perform communication, a comparison unit configured to compare management information stored in the self device and management information of any of the at least one other power transmission device, which is obtained by the information exchanging unit, and a determination unit configured to determine the self device as the power transmission device to be set as the master device, in a case where it is judged based on a result of comparison by the comparison unit that the self device has higher capabilities.

Accordingly, in a third aspect of the present invention, there is provided a wireless power feeding system for supplying electric power to a power reception device, in which a power transmission device that transmits electric power forms a group in cooperation with at least one other power transmission device, wherein the power transmission device comprises a power transmission unit configured to transmit electric power to the power reception device, a communication unit configured to perform communication with the power reception device or the at least one other power transmission device, an acquisition unit configured to acquire time information at a predetermined timing, an information exchanging unit configured to exchange information with any of the at least one other power transmission device, with which the communication unit can perform communication, a comparison unit configured to compare time information in management information stored in the self device and time information in management information of any of the at least one other power transmission device, which is obtained by the information exchanging unit, and a determination unit configured to determine the self device as the power transmission device to be set as the master device, in a case where it is judged based on a result of comparison by the comparison unit that time information of the self device is earliest.

Accordingly, in a fourth aspect of the present invention, there is provided a wireless power feeding system for supplying electric power to a power reception device, in which a power transmission device that transmits electric power forms a group in cooperation with at least one other power transmission device, wherein the power transmission device comprises a power transmission unit configured to transmit electric power to the power reception device, a communication unit configured to perform communication with the power reception device or the at least one other power transmission device, a calculation unit configured to calculate the number of communicatable power transmission devices, using the communication unit, an acquisition unit configured to acquire the number of communicatable power transmission devices from each communicatable one of the at least one other power transmission device, using the communication unit, a comparison unit configured to compare the number of communicatable power transmission devices, which is calculated by the calculation unit, and the number of communicatable power transmission devices of each communicable one of the at least one other power transmission device, which is acquired by the acquisition unit, and a determination unit configured to determine the self device as the power transmission device to be set as the master device, in a case where it is judged, based on a result of comparison by the comparison unit that the number of communicatable power transmission devices, which is calculated by the calculation unit, is larger than the number of communicatable power transmission devices of each communicatable one of the at least one other power transmission device, which is acquired by the acquisition unit.

Accordingly, in a fifth aspect of the present invention, there is provided a wireless power feeding system for supplying electric power to a power reception device, in which a power transmission device that transmits electric power forms a group in cooperation with at least one other power transmission device, wherein the power transmission device comprises a power transmission unit configured to transmit electric power to the power reception device, a communication unit configured to perform communication with the power reception device or the at least one other power transmission device, a calculation unit configured to calculate location information, a power feeding area, and a communication area of the self device, an acquisition unit configured to acquire, from each of the at least one other power transmission device location information, a power feeding area, and a communication area thereof, using the communication unit, a comparison unit configured to compare the location information, the power feeding area, and the communication area of the self device, which are calculated by the calculation unit, and the location information, the power feeding area, and the communication area of each of the at least one other power transmission device, which are acquired by the acquisition unit, and a determination unit configured to determine the self device as the power transmission device to be set as the master device, in a case it is judged based on a result of comparison by the comparison unit that the self device is advantageous.

Accordingly, in a sixth aspect of the present invention, there is provided a wireless power feeding system for supplying electric power to a power reception device, in which a power transmission device that transmits electric power forms a group in cooperation with at least one other power transmission device, wherein the power transmission device comprises a power transmission unit configured to transmit electric power to the power reception device, a communication unit configured to perform communication with the power reception device or the at least one other power transmission device, a generation unit configured to generate a random number, an acquisition unit configured to acquire a random number from each of the at least one other power transmission device, using the communication unit, a comparison unit configured to compare the random number of the self device, which is generated by the generation unit, and the random number which is acquired from each of the at least one other power transmission device, and a determination unit configured to determine the self device as the power transmission device to be set as the master device, in a case where it is judged based on a result of comparison by the comparison unit that the random number of the self device is larger than the random number acquired from each of the at least one other power transmission device.

Accordingly, in a seventh aspect of the present invention, there is provided a method of controlling a wireless power feeding system for supplying electric power to a power reception device, in which a power transmission device that transmits electric power forms a group in cooperation with at least one other power transmission device, comprising transmitting electric power from the power transmission device to the power reception device, performing communication with the power reception device or the at least one other power transmission device, exchanging information with any of the at least one other power transmission device, with which said communication can be performed, receiving a setting for determining a power transmission device to be set as a master device out of the self device and any of the at least one other power transmission device, with which said exchanging of information has been performed, and determining the self device as the power transmission device to be set as the master device, in a case where the received setting is a setting for determining the self device as the master device.

Accordingly, in an eighth aspect of the present invention, there is provided a method of controlling a wireless power feeding system for supplying electric power to a power reception device, in which a power transmission device that transmits electric power forms a group in cooperation with at least one other power transmission device, comprising transmitting electric power from the power transmission device to the power reception device, performing communication with the power reception device or the at least one other power transmission device, exchanging information with any of the at least one other power transmission device, with which said communication can be performed, comparing management information stored in the self device and management information of any of the at least one other power transmission device, which is obtained by said exchanging of information, and determining the self device as the power transmission device to be set as the master device, in a case where it is judged based on a result of said comparing that the self device has higher capabilities.

Accordingly, in a ninth aspect of the present invention, there is provided a method of controlling a wireless power feeding system for supplying electric power to a power reception device, in which a power transmission device that transmits electric power forms a group in cooperation with at least one other power transmission device, comprising transmitting electric power from the power transmission device to the power reception device, performing communication with the power reception device or the at least one other power transmission device, acquiring time information at a predetermined timing, exchanging information with any of the at least one other power transmission device, with which said communication can be performed, comparing time information in management information stored in the self device and time information in management information of any of the at least one other power transmission device, which is obtained by said exchanging of information, and determining the self device as the power transmission device to be set as the master device, in a case where it is determined based on a result of said comparing that time information of the self device is earliest.

Accordingly, in a tenth aspect of the present invention, there is provided a method of controlling a wireless power feeding system for supplying electric power to a power reception device, in which a power transmission device that transmits electric power forms a group in cooperation with at least one other power transmission device, comprising transmitting electric power from the power transmission device to the power reception device, performing communication with the power reception device or the at least one other power transmission device, calculating the number of communicatable power transmission devices, using said communication, acquiring the number of communicatable power transmission devices from each communicatable one of the at least one other power transmission device, using said communication, comparing the number of communicatable power transmission devices, which is calculated by said calculating, and the number of communicatable power transmission devices of each communicable one of the at least one other power transmission device, which is acquired by said acquiring, and determining the self device as the power transmission device to be set as the master device, in a case where it is judged, based on a result of said comparing that the number of communicatable power transmission devices, which is calculated by said calculating, is larger than the number of communicatable power transmission devices of each communicable one of the at least one other power transmission device, which is acquired by said acquiring.

Accordingly, in an eleventh aspect of the present invention, there is provided a method of controlling a wireless power feeding system for supplying electric power to a power reception device, in which a power transmission device that transmits electric power forms a group in cooperation with at least one other power transmission device, comprising transmitting electric power from the power transmission device to the power reception device, performing communication with the power reception device or the at least one other power transmission device, calculating location information, a power feeding area, and a communication area of the self device, acquiring, from each of the at least one other power transmission device, location information, a power feeding area, and a communication area thereof, using said communication, comparing the location information, the power feeding area, and the communication area of the self device, which are calculated by said calculating, and the location information, the power feeding area, and the communication area of each of the at least one other power transmission device, which are acquired by said acquiring, and determining the self device as the power transmission device to be set as the master device, in a case it is judged based on a result of said comparing that the self device is advantageous.

Accordingly, in a twelfth aspect of the present invention, there is provided a method of controlling a wireless power feeding system for supplying electric power to a power reception device, in which a power transmission device that transmits electric power forms a group in cooperation with at least one other power transmission device, comprising transmitting electric power from the power transmission device to the power reception device, performing communication with the power reception device or the at least one other power transmission device, generating a random number, acquiring a random number from each of the at least one other power transmission device, using said communication, comparing the generated random number of the self device and the acquired random number from each of the at least one other power transmission device, and determining the self device as the power transmission device to be set as the master device, in a case where it is judged based on a result of said comparing that the calculated random number of the self device is larger than the acquired random number from each of the at least one other power transmission device.

Accordingly, in a thirteenth aspect of the present invention, there is provided a computer-executable program for causing a power transmission device to execute a method according to any one of the seventh, eighth, ninth, tenth, eleventh, and twelfth aspects of the invention.

Advantageous Effects of Invention

According to the present invention, in a case where a plurality of power transmission devices are disposed in the wireless power feeding system, it is possible to determine a master-slave relationship between the power transmission devices by setting one power transmission device as a master power transmission device.

Further features of the present invention will become apparent from the following description of exemplary embodiments (with reference to the attached drawings).

BRIEF DESCRIPTION OF DRAWINGS

FIG. 14 is a diagram showing an example of a power transmission device information management table in the fourth embodiment.

FIG. 15 is a diagram showing an example of a power transmission device count management table in the fourth embodiment.

FIG. 19 is a diagram showing an example of a power transmission device information management table in the fifth embodiment.

FIG. 21 is a diagram showing an example of a power transmission device random number management table in the sixth embodiment.

DESCRIPTION OF EMBODIMENTS

The present invention will now be described in detail below with reference to the drawings showing an embodiment thereof.

Figure 1:
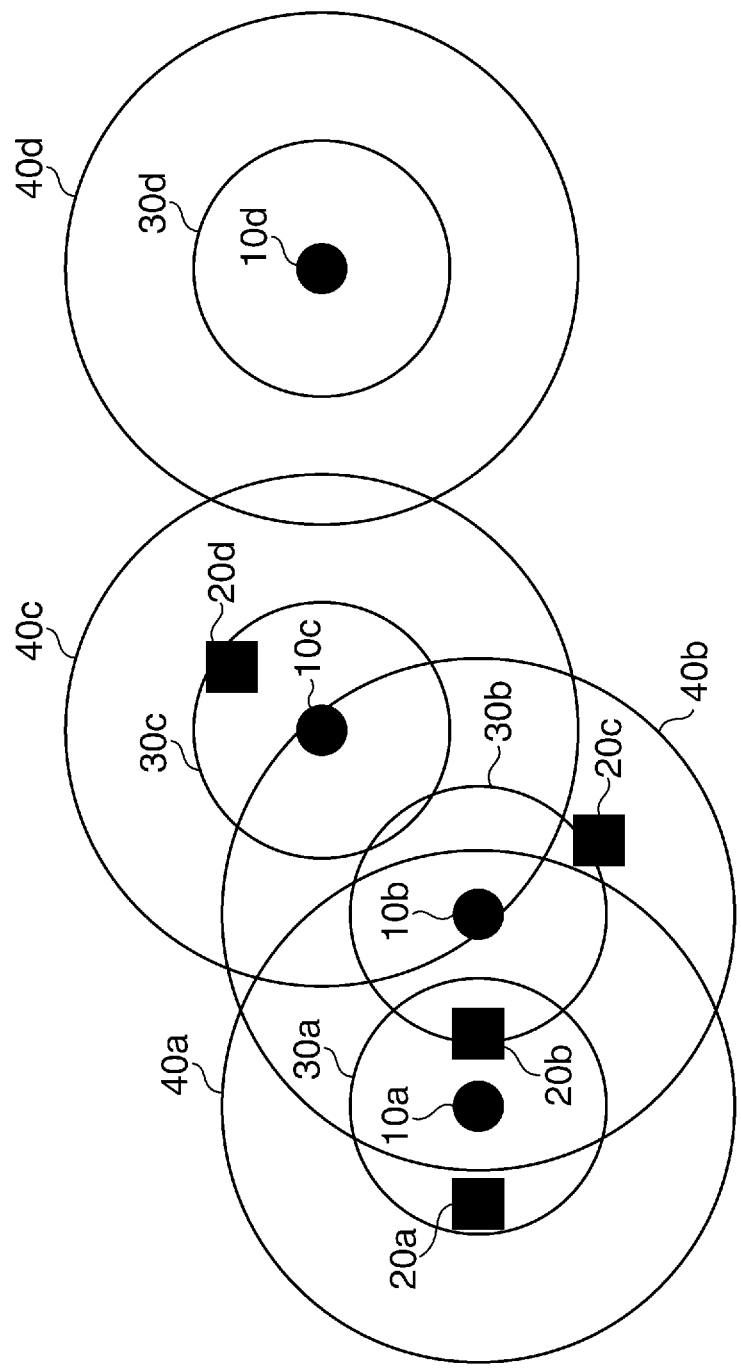
FIG. 1 is a conceptual diagram of a wireless power feeding system according to a first embodiment of the present invention.

FIG. 1 is a conceptual diagram of an N-to-N wireless power feeding system according to a first embodiment of the present invention, in which a plurality of power transmission devices transmit electric power to a plurality of power reception devices.

The power transmission devices, denoted by reference numerals 10a, 10b, 10c, and 10d, wirelessly feed electric power to the power reception devices, denoted by reference numerals 20a, 20b, 20c, and 20d. Further, the power transmission devices 10a, 10b, 10c, and 10d each perform data communication required for feeding power, with the power reception devices 20a, 20b, 20c, and 20d which exist within a communicatable area.

The power reception devices 20a, 20b, 20c, and 20d receive electric power wirelessly fed from the power transmission devices 10a, 10b, 10c, and 10d. Further, the power reception devices 20a, 20b, 20c, and 20d each perform data communication required for receiving fed power, with the power transmission devices 10a, 10b, 10c, and 10d which exist within a communicatable area.

Power feeding areas 30a, 30b, 30c, and 30d indicate areas within which power feeding from the power transmission devices 10a, 10b, 10c, and 10d to the power reception devices 20 can be performed, respectively.

Communication areas 40a, 40b, 40c, and 40d indicate areas within which data communication can be performed by the power transmission devices 10a, 10b, 10c, and 10d, respectively.

The power feeding areas 30a to 30d and the communication areas 40a to 40d of the power transmission devices 10a to 10d have a relationship in which the communication areas 40a to 40d are wider than the power feeding areas 30a to 30d, and the power feeding areas 30a to 30d are completely included in the communication areas 40a to 40d, respectively.

In a case where power feeding areas overlap as occurring between the power transmission devices 10a and 10b (or the power transmission devices 10b and 10c) in FIG. 1, a group is formed by these devices, and one of them is set as a master device. The power transmission device set as the master device determines which of the power transmission devices is to feed electric power to a power reception device existing in the power feeding areas of the group.

Figure 2:
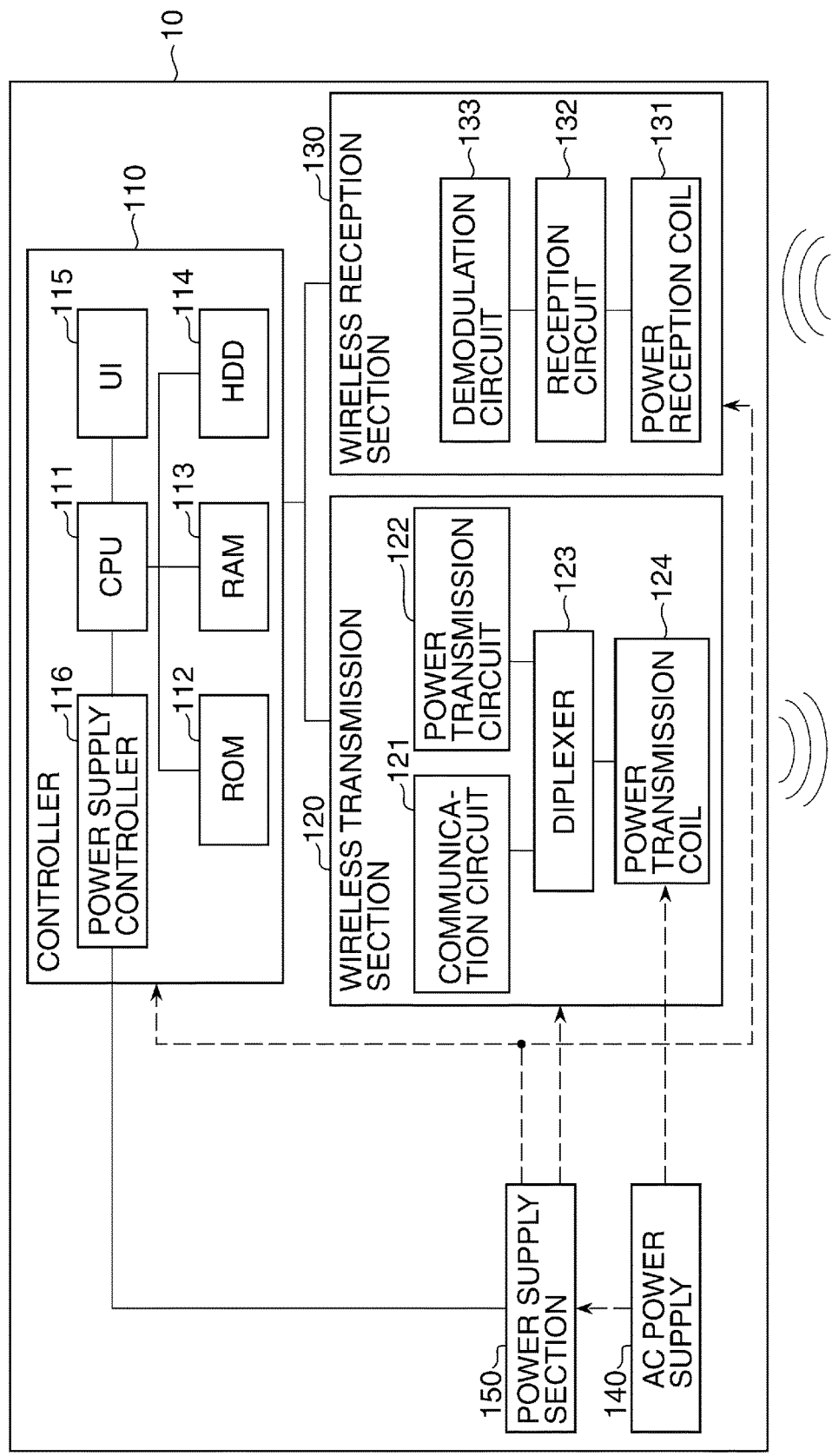
FIG. 2 is a schematic block diagram of a power transmission device appearing in FIG. 1.

FIG. 2 is a schematic block diagram of each power transmission device 10 appearing in FIG. 1. In FIG. 2, a solid line indicates exchange of data, and a broken line indicates supply of power.

Each power transmission device 10 includes a controller 110, a wireless transmission section 120, a wireless reception section 130, an AC power supply 140, and a power supply section 150. The controller 110 is configured to control the power transmission device 10. The controller 110 includes a CPU 111, a ROM 112, a RAM 113, an HDD 114, a user interface 115, and a power supply controller 116. The controller 110 is connected to the wireless transmission section 120 and the wireless reception section 130 via an internal bus.

The CPU 111 processes various data, and controls the overall operation of the power transmission device 10. The ROM 112 is a nonvolatile storage medium that stores a boot program and the like used by the CPU 111. The RAM 113 is a volatile storage medium for temporarily storing data and programs used by the CPU 111, and data acquired in Info exchange (step S302 in FIG. 4).

Figure 4:
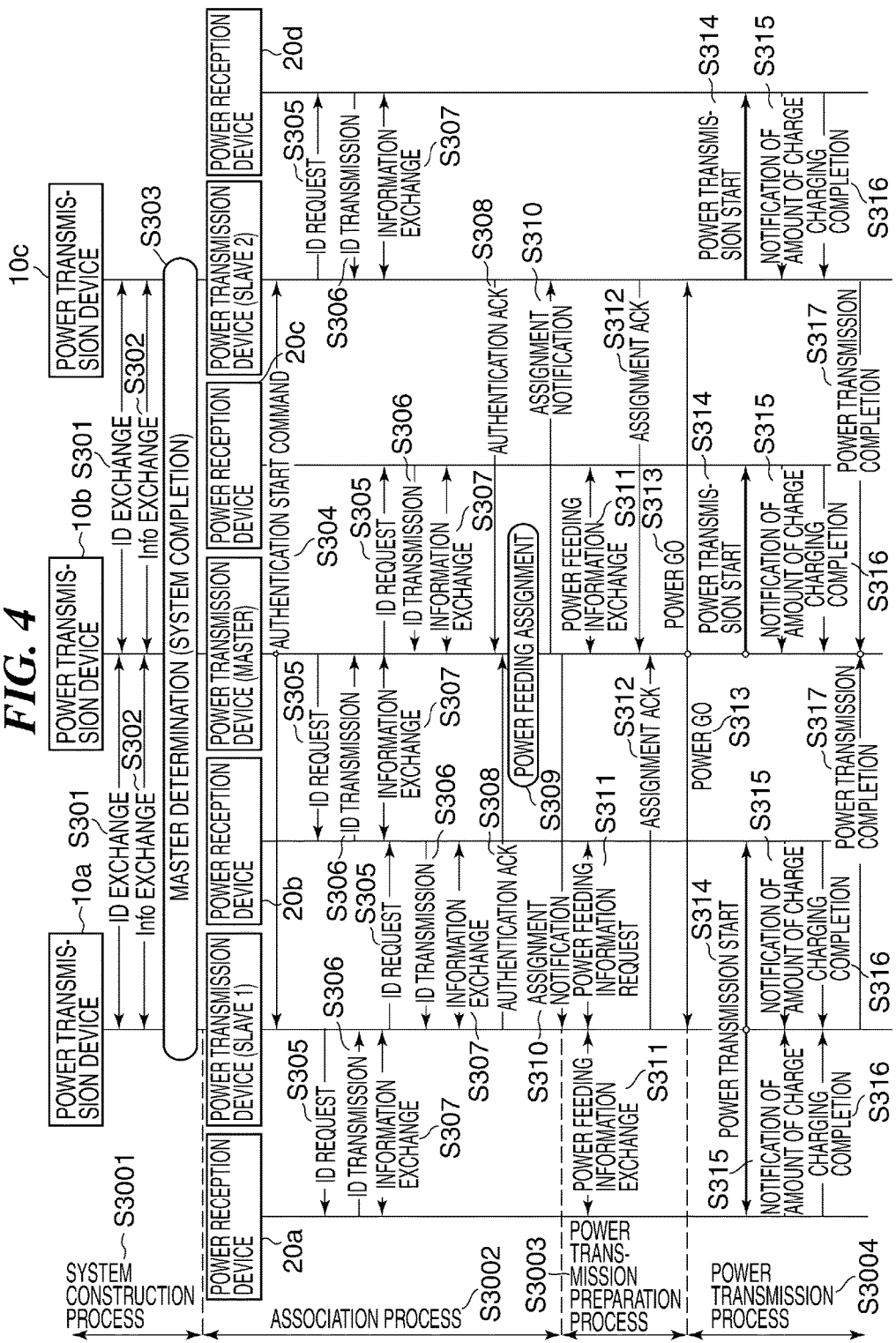
FIG. 4 is a sequence diagram of the whole wireless power feeding system according to the first embodiment.

The HDD 114 is a nonvolatile storage medium that stores an OS (operating system) and applications used by the CPU 111, and self device information and the like transmitted in Info exchange (step S302 in FIG. 4). The user interface 115 displays various information to a user, and receives various instructions from the user. The power supply controller 116 controls power supply to each block.

The wireless transmission section 120 is configured to wirelessly transmit electric power to the power reception devices 20. The wireless transmission section 120 includes a communication circuit 121, a power transmission circuit 122, a diplexer 123, and a power transmission coil 124.

The communication circuit 121 generates a modulated signal for performing communication. The power transmission circuit 122 generates a modulated signal for transmitting electric power.

The diplexer 123 synthesizes the modulated signal generated by the communication circuit 121 and the modulated signal generated by the power transmission circuit 122. The power transmission coil 124 transmits the modulated signal synthesized by the diplexer 123 to the other power transmission devices 10 and the power reception devices 20.

The wireless reception section 130 is configured to receive data from the power reception devices 20. The wireless reception section 130 includes a power reception coil 131, a reception circuit 132, and a demodulation circuit 133. The power reception coil 131 receives a modulated signal for performing communication from the other power transmission devices 10 and the power reception devices 20. The reception circuit 132 receives the modulated signal received by the power reception coil 131. The demodulation circuit 133 demodulates the modulated signal received by the reception circuit 132.

The AC power supply 140 supplies an AC voltage to the power transmission coil 124 and the power supply section 150. The power supply section 150 converts the AC voltage supplied by the AC power supply 140 to a DC voltage, and supplies the DC voltage to the controller 110, the wireless transmission section 120, and the wireless reception section 130.

Figure 3:
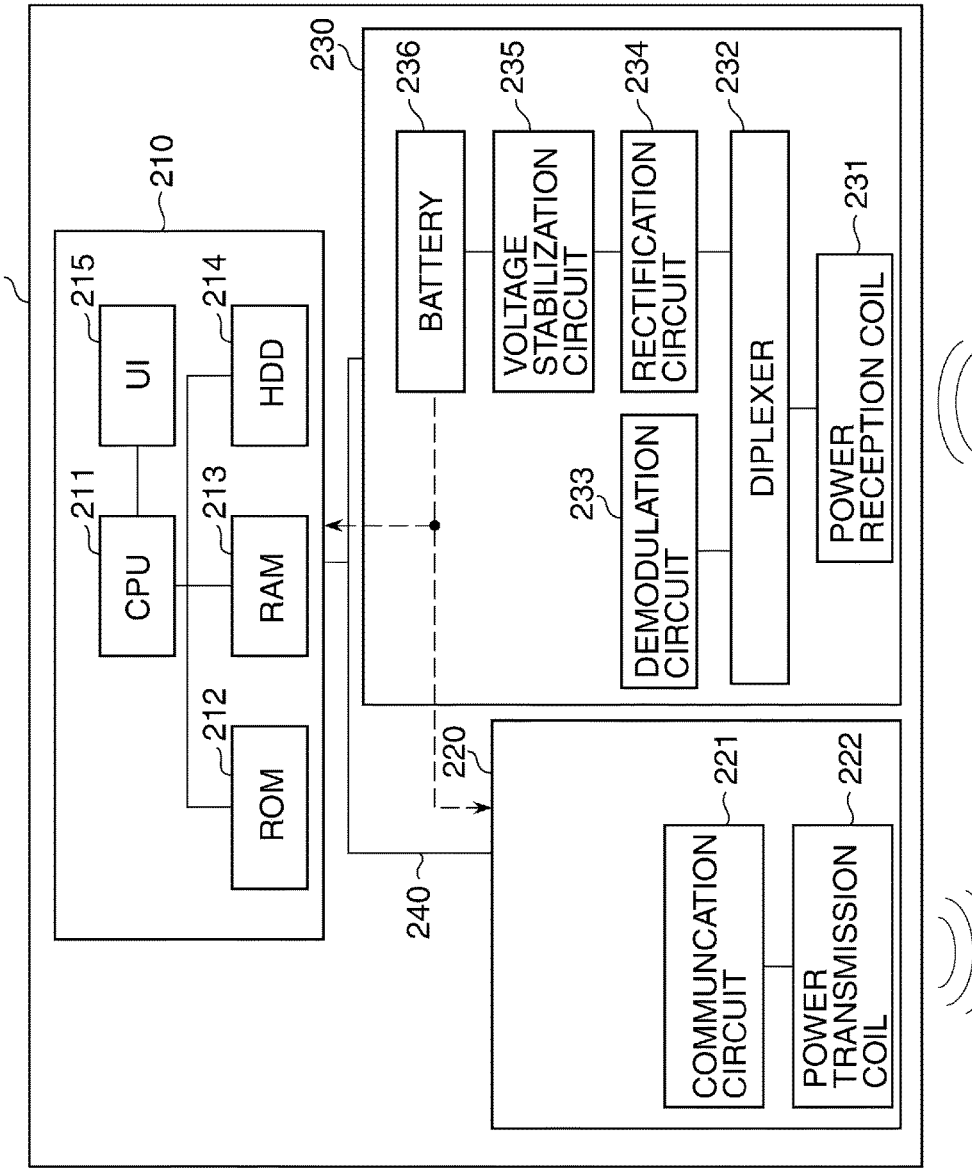
FIG. 3 is a schematic block diagram of a power reception device appearing in FIG. 1.

FIG. 3 is a schematic block diagram of each of the power reception devices 20 (20a, 20b, 20c, 20d) appearing in FIG. 1. In FIG. 3, a solid line indicates exchange of data, and a dotted line indicates supply of power supply.

Each power reception device 20 includes a controller 210, a wireless transmission section 220, and a wireless reception section 230. The controller 210 is configured to control the power reception device 20. The controller 210 includes a CPU 211, a ROM 212, a RAM 213, an HDD 214, and a user interface 215. The controller 210 is connected to the wireless transmission section 220 and the wireless reception section 230 via an internal bus 240.

The CPU 211 processes various data, and controls the power reception device 20. The ROM 212 is a nonvolatile storage medium that stores a boot program and the like used by the CPU 211.

The RAM 213 is a volatile storage medium for temporarily storing data, programs, and the like, used by the CPU 211. The HDD 214 is a nonvolatile storage medium that stores an OS, applications, and the like, used by the CPU 211. The user interface 215 displays various information to a user, and receives various instructions from the user.

The wireless transmission section 220 is configured to transmit data to the power transmission devices 10. The wireless transmission section 220 includes a communication circuit 221 and a power transmission coil 222.

The communication circuit 221 generates a modulated signal for performing communication. The power transmission coil 222 transmits the modulated signal generated by the communication circuit 221 to the power transmission devices 10.

The wireless reception section 230 is configured to receive electric power from the power transmission devices 10. The wireless reception section 230 includes a power reception coil 231, a diplexer 232, a demodulation circuit 233, a rectification circuit 234, a voltage stabilization circuit 235, and a battery 236.

The power reception coil 231 receives a modulated signal from the power transmission device 10.

The diplexer 232 separates the modulated signal received by the power reception coil 231 into a modulated signal for performing communication and a modulated signal for transmitting electric power.

The demodulation circuit 233 demodulates the modulated signal for performing communication, separated by the diplexer 232. The rectification circuit 234 rectifies the modulated signal for transmitting electric power, separated by the diplexer 232, to generate a DC voltage. The voltage stabilization circuit 235 stabilizes the DC voltage generated by the rectification circuit 234. The battery 236 receives the voltage stabilized by the voltage stabilization circuit 235 to accumulate electric power, i.e. store electric charge. Further, the battery 236 supplies a DC voltage to the controller 210, the wireless transmission section 220, and the wireless reception section 230, based on the charged electric power.

Next, as to the N-to-N wireless power feeding system in which a plurality of power transmission devices transmit electric power to a plurality of power reception devices, a description will be given of exchange of data between the devices, from a step of forming a group by the plurality of power transmission devices to a step of terminating power transmission to the plurality of power reception devices.

FIG. 4 is a sequence diagram of the whole wireless power feeding system shown in FIG. 1.

In explaining a series of sequences performed by the wireless power feeding system, a situation in which the power transmission devices 10a, 10b, 10c, and 10d, appearing in FIG. 1, transmit electric power to the power reception devices 20a, 20b, 20c, and 20d will be described.

The series of sequences performed by the N-to-N wireless power feeding system is formed by four processes of a system construction process (S3001), an association process (S3002), a power transmission preparation process (S3003), and a power transmission process (S3004).

In the system construction process (S3001), the power transmission devices 10a to 10d determine whether or not to form a group, and determine a master device of the system.

In a step S301, the power transmission devices 10a to 10d each exchange a power transmission device ID held in the ROM 112 or the HDD 114, with one another. In doing this, it is not known whether or not devices with which each device can communicate exist in its vicinity, and hence first, any desired power transmission device, which is the power transmission device 10b in the present example, transmits a broadcast packet to acquire power transmission device IDs from the power transmission devices 10a and 10c which have responded to the packet. Next, the power transmission device 10b transfers the acquired power transmission device IDs of the power transmission devices 10a and 10c to the power transmission devices 10c and 10a, respectively. Thus, the power transmission devices 10a, 10b, and 10c each acquire the power transmission device IDs of the power transmission devices other than the self device. Further, at this time, the power transmission device 10d does not exist within the communication areas 40a, 40b, and 40c of the power transmission devices 10a to 10c, and hence the power transmission device 10d cannot perform power transmission device ID exchange, and so that it operates alone separately from the wireless power feeding system.

In the step S302, the power transmission devices 10a to 10c having formed a group by exchanging their IDs then each exchange information on the self device held therein with one another, including location information, a power transmittable distance, a communicatable distance, and maximum transmittable electric power.

In a step S303, the power transmission devices 10a to 10c perform processing for determining a master device in the group, by using the information exchanged in the steps S301 and S302. The master device has an authority to determine which of the power transmission devices 10a to 10c is to transmit power to which of the power reception devices 20a to 20d. FIG. 4 shows a case where the power transmission device 10b is determined as the master device, and the power transmission devices 10a and 10c are determined as slave devices.

In the present embodiment, the master device is determined based on the information acquired in the step S302 according to predetermined conditions.

This completes the system construction of the power transmission devices 10a to 10c.

Next, in the association process (S3002), a power transmission device and a power reception device are associated with each other by the following two steps.

The first step is an authentication operation for identifying the presence of a power reception device in any of the respective communication areas of the power transmission devices 10a to 10c. The second step is an assignment operation in which the power transmission device 10b as the master notifies the power transmission devices 10a and 10c, as the slaves, of assignment of the power reception devices 20a to 20d for which power transmission is to be performed, based on results of authentication of each power transmission device. These steps will be described in detail hereafter.

In a step S304, the power transmission device 10b as the master issues an authentication start command to the power transmission devices 10a and 10c as the slaves. The authentication operations between the power transmission devices 10a to 10c and the power reception devices 20a to 20d are executed in steps S305 to S307.

In the step S305, the power transmission devices 10a to 10c each issue a device ID request by broadcast transmission so as to check whether or not a power reception device exists within the communication area of the self device.

In the step S306, the power reception devices 20a to 20d each transmit the device ID information to the power transmission devices 10a to 10c from which the device ID request has been received.

In the step S307, information indicative of results of checking whether or not each of the power reception devices 20a to 20c is in each of the power feeding areas 30a to 30c of the power transmission devices 10a to 10c is exchanged between the power transmission devices 10a to 10c. Whether or not each power reception device is in any of the power feeding areas 30a to 30c may be determined based on a result of training of electric power transmission from each of the power transmission devices 10a to 10c to each of the power reception devices 20a to 20d. Alternatively, any other method may be used insofar as locations of the power reception devices 20a to 20d are recognized. For example, the power transmission devices 10a to 10c may be each equipped with a location sensor, not shown, and the determination may be performed based on a result of detection from the sensor.

In a step S308, when the power transmission devices 10a and 10c as the slaves have exchanged information with the power reception devices 20a, 20b, and 20d which exist in the respective communication areas of the self devices, the power transmission devices 10a and 10c, as the slaves, notify the power transmission device 10b, as the master, of completion of information exchange together with the results, to thereby terminate the authentication step.

In a step S309, the power transmission device 10b as the master executes the assignment operation for determining which of the power transmission devices 10a to 10c is to transmit electric power to which of the power reception devices 20a to 20d, based on the results of authentication of the power reception devices 20b and 20c with which the self device can communicate and the power reception devices 20a, 20b, and 20d with which the power transmission devices 10a and 10c as the slaves can communicate. Assuming here a case where electric power is simultaneously transmitted from the power transmission devices 10a and 10b to the power reception device 20b which exists in an area where the power feeding areas 30a and 30b of the power transmission devices 10a and 10b overlap, wireless transmission from these power transmission devices interfere with each other, which degrades power feeding efficiency, or which disables power feeding. Therefore, in FIG. 4, it is shown that the power transmission device 10b as the master determines that the power transmission device 10a is to transmit electric power to the power reception device 20*b*. The association process is thus completed (S3002). After completing the association process (S3002), the process shifts to the power transmission preparation process (S3003).

In the power transmission preparation process (S3003), various settings for transmitting electric power from the power transmission devices 10*a* to 10*c* to the power reception devices 20*a* to 20*d* are made based on the determined assignment of power transmission between the power transmission devices 10*a* to 10*c*. The following description will be given of operations in the power transmission preparation process (S3003).

In a step S310, the power transmission device 10*b* as the master executes assignment notification for notifying the power transmission devices 10*a* and 10*c*, as the slaves, of the device IDs of the power reception devices 20*a* to 20*d* to which power transmission is to be executed.

In a step S311, the power transmission devices 10*a* and 10*c* as the slaves exchange power feeding information required for feeding electric power with the power reception devices 20*a*, 20*b*, and 20*d* designated by the power transmission device 10*b* as the master. The information to be exchanged includes, for example, a power transmission frequency and remaining electric power information of each of the power reception devices 20*a*, 20*b*, and 20*d*.

When the power feeding information has been exchanged, in a step S312, the power transmission devices 10*a* and 10*c* as the slaves each send to the power transmission device 10*b* as the master an assignment ACK which indicates completion of preparation for electric power transmission to the assigned power reception devices 20*a*, 20*b*, and 20*d*. When the assignment ACK has been sent from all of the power transmission devices 10*a* and 10*c* as the slaves to the power transmission device 10*b* as the master, the power transmission preparation process (S3003) is terminated. After termination of the power transmission preparation process (S3003), the process finally shifts to the power transmission process (S3004).

In the power transmission process (S3004), the power transmission devices 10*a* to 10*c* execute electric power transmission to respective ones of the power reception devices 20*a* to 20*d* to which they are responsible for transmitting electric power.

In a step S313, the power transmission device 10*b* as the master instructs the self device and the power transmission devices 10*a* and 10*c* as the slaves to start power transmission (power feeding) to the power reception devices 20*a* to 20*d*.

In a step S314, wireless power feeding from the power transmission devices 10*a* to 10*c* to the power reception devices 20*a* to 20*d* is started. In the power transmission process (S3004), in a step S315, the power reception devices 20*a* to 20*d*, which are receiving electric power, each periodically notify the amount of charge to one of the power transmission devices 10*a* to 10*c*, as a power supply source. Then, in a step S316, when each of the power reception devices 20*a* to 20*d* is fully charged, it notifies the one of the power transmission devices 10*a* to 10*c*, as the power supply source, of completion of charging. Then, each power transmission device notifies, upon completion of power feeding to the power reception device assigned thereto, the power transmission device 10*b*, as the master, of power transmission termination (step S317).

The power transmission device 10*b* as the master receives the charge completion notification from the power reception device 10*c* assigned thereto and the power transmission termination notification from the power transmission devices as the slaves (S3004), whereby the power transmission process is terminated, and then the process shifts to the association process (S3002) again.

As described above, after execution of the system construction process (S3001), the series of sequences from the association process (S3002) to the power transmission process (S3004) is repeated, whereby the N-to-N wireless power feeding system is made functional.

Figure 5:
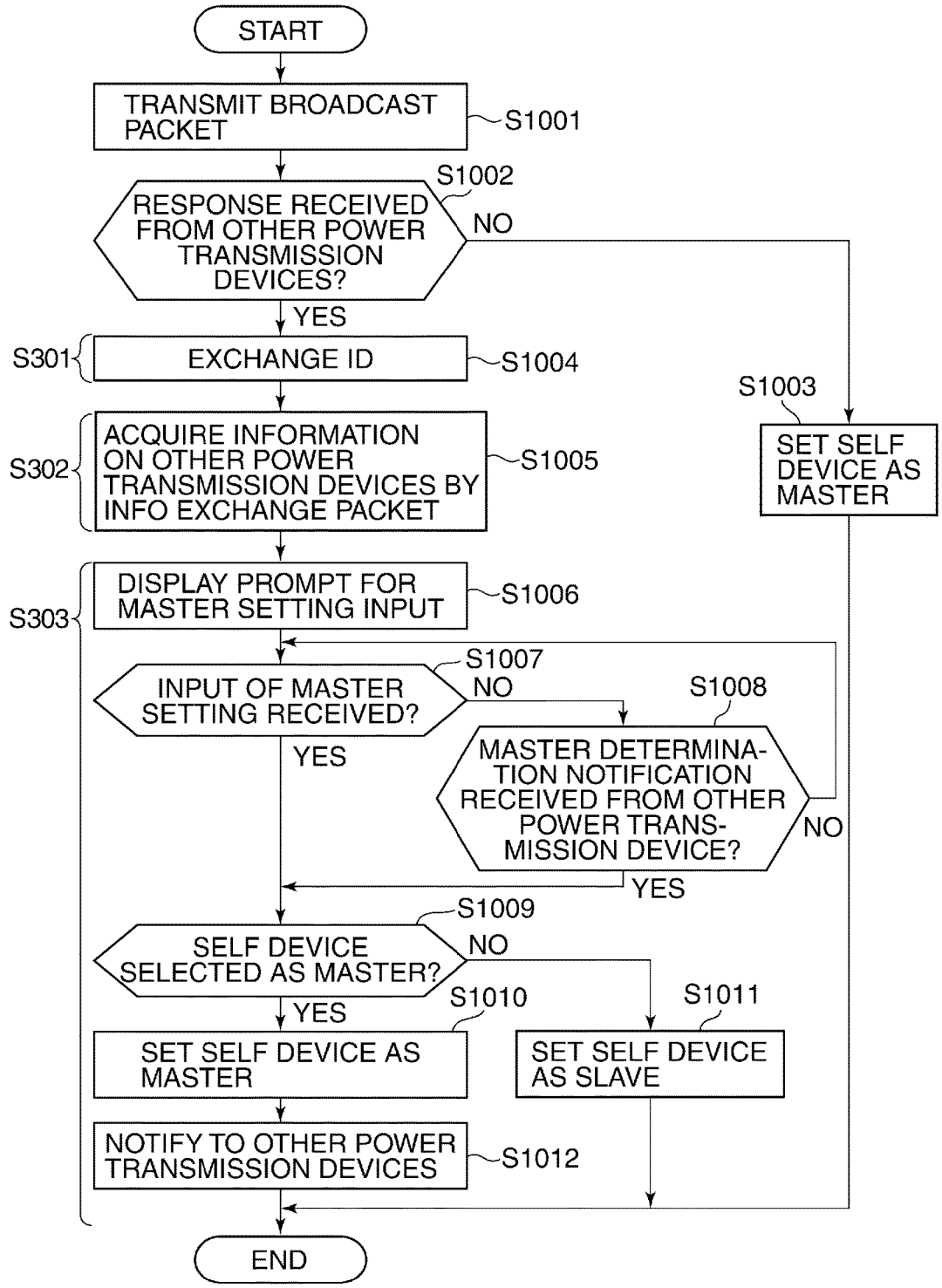
FIG. 5 is a flowchart of a system construction process in FIG. 4.

FIG. 5 is a flowchart of the system construction process (S3001) in FIG. 4. Although in this process, the control performed by the power transmission device 10*b* appearing in FIG. 1 will be described by way of example, the same control is performed also by each of the power transmission devices 10*a*, 10*c*, and 10*d*. Further, the present process is executed by the CPU 111 based on a program stored in the ROM 112 of the power transmission device 10*b*.

In a step S1001, when the power transmission device 10*b* is powered on, the CPU 111 transmits a broadcast packet so as to check whether or not any other power transmission devices (any of the other power transmission devices 10*a*, 10*c*, and 10*d*, in the present example) exist.

In a step S1002, the CPU 111 checks whether or not a response to the broadcast packet transmitted in the step S1001 is received. If no response is received, the CPU 111 judges that there is no power transmission device 10 in the vicinity of the power transmission device 10*b*, and proceeds to a step S1003, wherein the CPU 111 sets the self device as the master device. If a response is received, in a step S1004, the CPU 111 exchanges the power transmission device ID (S301) so as to exchange information with the power transmission device(s) 10 having transmitted the response.

After exchanging the power transmission device ID(s), in a step S1005, the CPU 111 performs Info exchange (S302) so as to check specifications of each power transmission device. The information used for Info exchange is held in a nonvolatile storage device, such as the ROM 112 or the HDD 114, of the power transmission device 10*b*. Further, FIG. 6 shows an example of the information.

Figure 6:
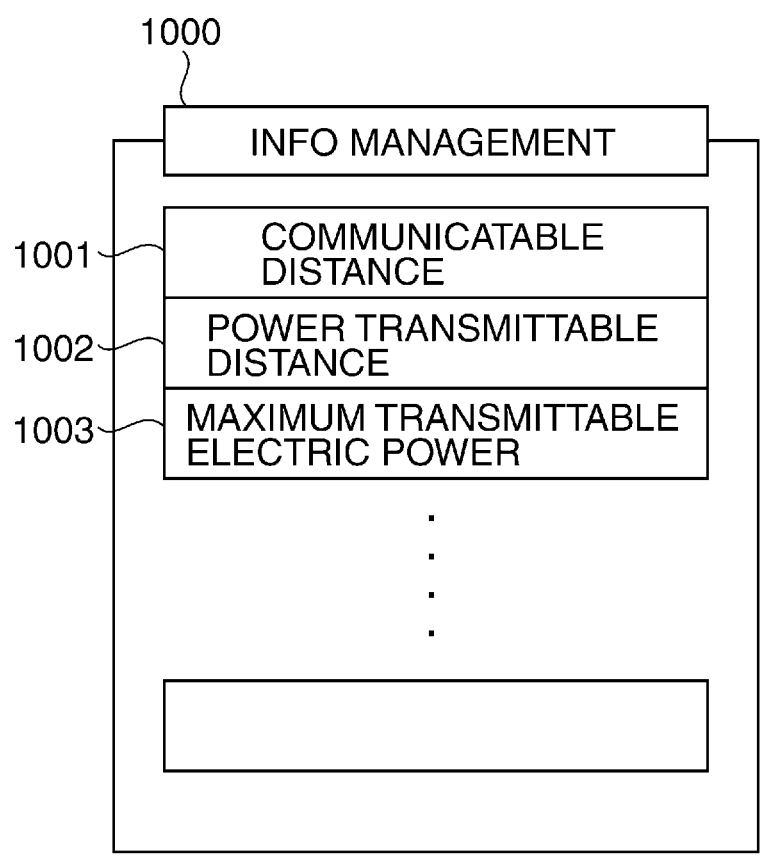
FIG. 6 is a diagram showing details of Info management information in the first embodiment.

FIG. 6 is a diagram showing details of Info management information 1000 which is used in the first embodiment.

The Info management information 1000 is information exchanged in the Info exchange (S302). Reference numeral 1001 denotes information indicative of a communicatable distance over which the power transmission device 10*b* can perform communication. Reference numeral 1002 denotes information indicative of a power transmittable distance over which the power transmission device 100*b* can transmit electric power. Reference numeral 1003 denotes information indicative of maximum transmittable electric power which can be transmitted from the power transmission device 10*b* to one power reception device 20.

In the flowchart of the system construction process (S3001) in FIG. 5, steps S1006 to S1012 correspond to the master determination processing (S303) in FIG. 4.

Figure 7:
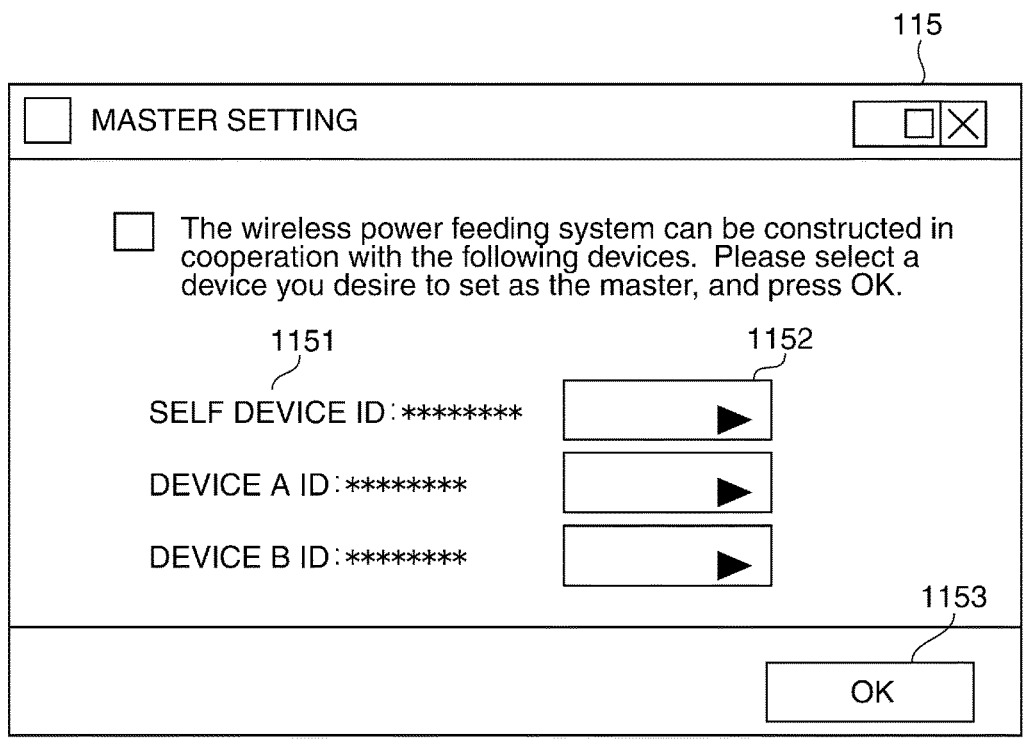
FIG. 7 is a diagram showing an example of a master setting display screen displayed on a user interface.

In the step S1006, the CPU 111 causes the user interface 115 to perform display for prompting the user to select the master device and performs processing for enabling the same to receive user's input, so as to select one of the power transmission devices 10*a* to 10*c* which have exchanged the power transmission device IDs in the step S1004, including the self device, as a master. FIG. 7 shows an example of the display on the user interface 115.

FIG. 7 is a diagram showing an example of a master setting display screen displayed on the user interface 115. The display screen is provided by a touch panel, and the user selects a device desired to be set as the master device. For example, if the user desires to set the self device 1151 as the maser device, the user presses a selection button 1152, and then presses an OK button 1153.

In FIG. 5, in the step S1007, the CPU 111 determines whether or not an input for determining the master device is received from the user interface 115, and if no input is received, the CPU 111 determines whether or not a master determination notification is received from the other power transmission device 10a or 10c in the step S1008. If the answer to the question of the step S1007 or S1008 is affirmative (YES), the CPU 111 proceeds to the step S1009.

In the step S1009, the CPU 111 determines whether or not the self device has been selected as the master device. If it is determined that the self device has been selected as the master device, the CPU 111 recognizes (sets) the self device as the master device in the step S1010, whereas if not, the CPU 111 recognizes (sets) the self device as the slave device in the step S1011, followed by terminating the present process.

If the CPU 111 recognizes the self device as the master device in the step S1010, the CPU 111 proceeds to the step S1012, wherein the CPU 111 notifies the power transmission devices 10a and 10c with which the power transmission device IDs have been exchanged in the step S1004 that the self device is set as the master device, followed by terminating the present process.

Note that a case where the CPU 111 receives the master determination notification from the other power transmission device 10a or 10c in the step S1008 is a case where the power transmission device 10a or 10c has executed the step S1012.

Although in the system construction process (S3001) in FIG. 5, the operation performed when the power transmission device 10b is powered on has been described, the system construction process may be performed when a wireless power feeding system is newly constructed after the power transmission process (S3004) is terminated.

Next, a description will be given of a second embodiment of the present invention. The present embodiment has the same configurations of the power transmission device 10 and the power reception device 20 as those in the first embodiment, but differs from the first embodiment in the management information held by the power transmission device 10 and the control method of determining the master device. The following description will be given only of the different points from the first embodiment.

Figure 8:
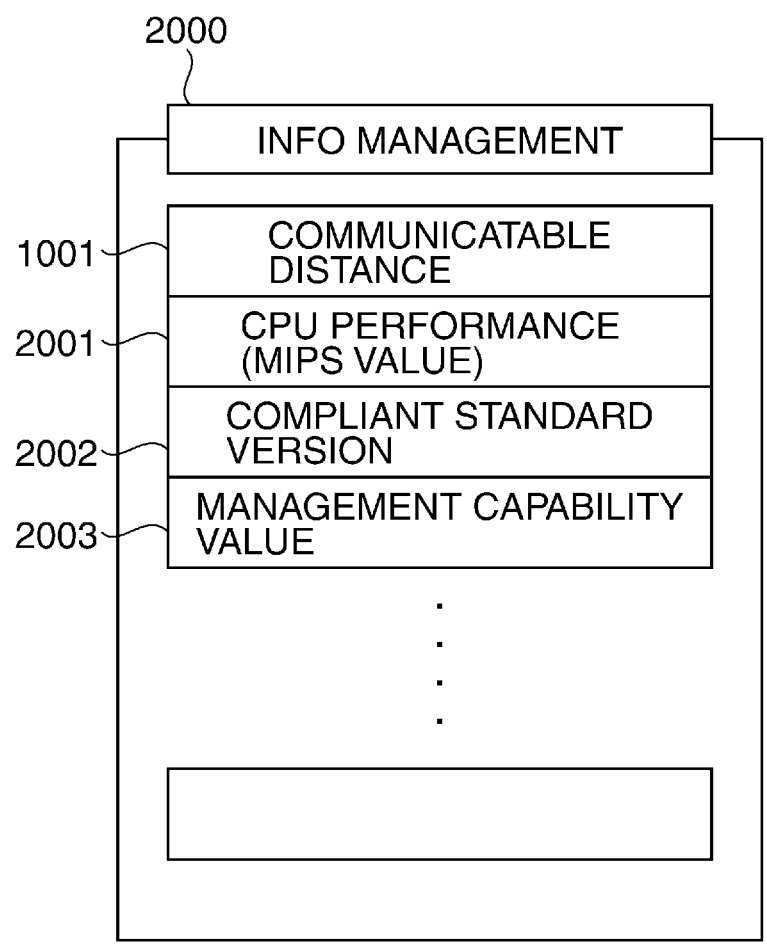
FIG. 8 is a diagram showing details of Info management information in a second embodiment of the present invention.

FIG. 8 is a diagram showing details of Info management information 2000 used in the second embodiment.

The Info management information 2000 differs from the Info management information 1000 shown in FIG. 6 in that it includes, besides the communicatable distance 1001, a CPU performance (MIPS value) 2001, a compliant standard version 2002, and a management capability value 2003.

The CPU performance (MIPS value) 2001 represents an MIPS value which represents a processing speed (performance) of the CPU by a numerical value. The compliant standard version 2002 represents version information indicating a version of the standard with which the present wireless power feeding system is compliant. The management capability value 2003 represents the number of power reception devices 20 which can be managed by this power transmission device 10.

Figure 9:
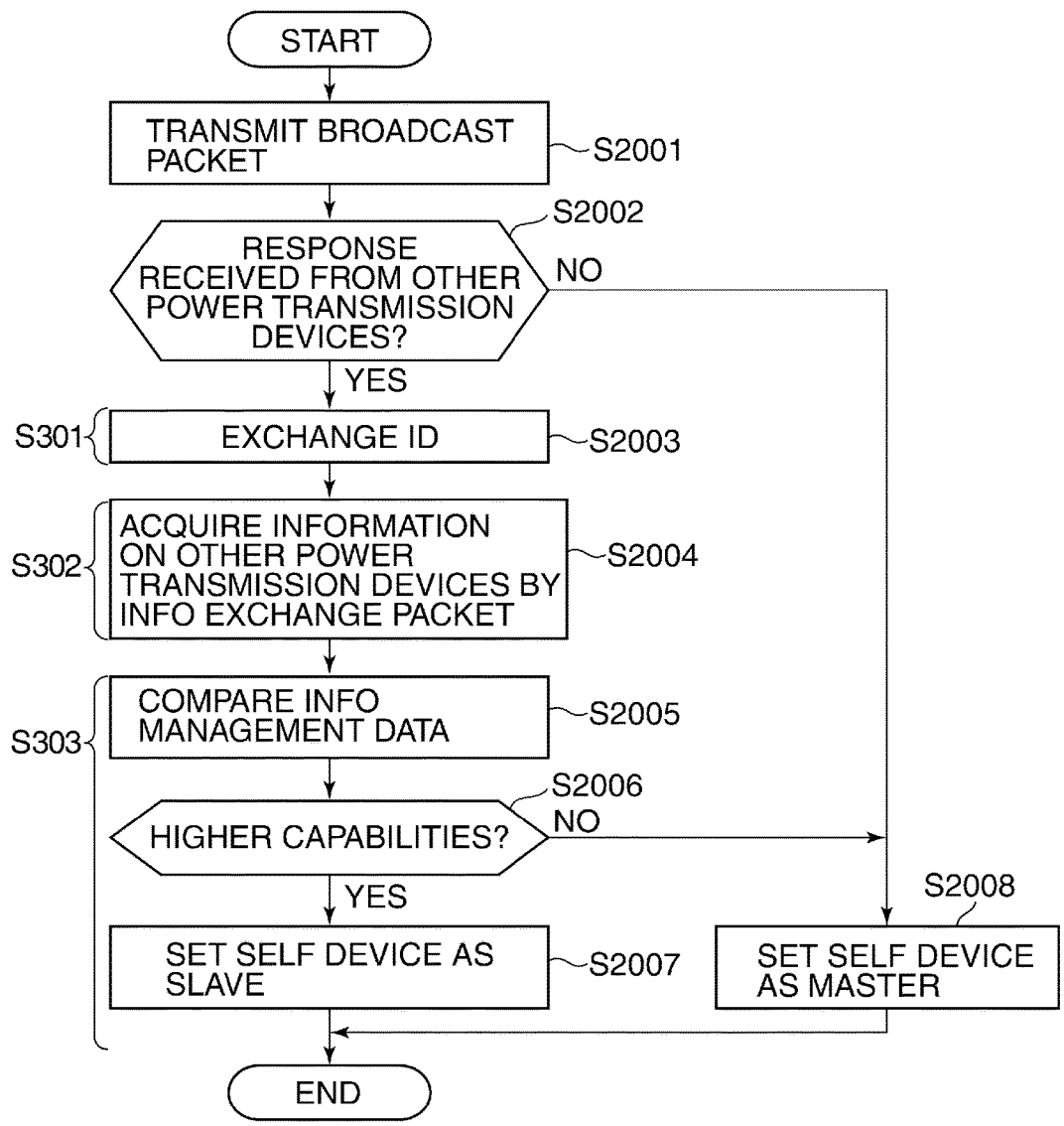
FIG. 9 is a flowchart of an essential part of the system construction process in FIG. 4 in the second embodiment.

FIG. 9 is a flowchart of an essential part of the system construction process (S3001) in FIG. 4 in the second embodiment. Although in this process, the description will be given of the control performed by the power transmission device 10b appearing in FIG. 1, by way of example, the same control is performed also by the power transmission devices 10a, 10c, and 10d. Further, the present process is executed by the CPU 111 based on a program stored in the ROM 112 of the power transmission device 10b.

In a step S2001 in FIG. 9, when the power transmission device 10b is powered on, the CPU 111 transmits a broadcast packet so as to check whether or not any other power transmission devices (any of the other power transmission devices 10a, 10c, and 10d, in the present example) exist.

In a step S2002, the CPU 111 determines whether or not a response to the broadcast packet transmitted in the step S2001 is received. If no response is received, the CPU 111 judges that there is no power transmission device 10 in the vicinity of the power transmission device 10b, and proceeds to a step S2008, wherein the CPU 111 sets the self device as the master device. If a response is received, in a step S2003, the CPU 111 exchanges the power transmission device ID (S301) so as to exchange information with the power transmission device(s) 10 having transmitted the response.

After exchanging the power transmission device ID(s), in a step S2004, the CPU 111 performs Info exchange (S302) so as to check specifications of each power transmission device. In this Info exchange (S302), specifications of the device, such as the management information and the throughput of the self device held in the nonvolatile storage device, such as the ROM 112 or the HDD 114, are exchanged.

In the flowchart of the essential part of the system construction process (S3001) in FIG. 9, steps S2005 to S2008 correspond to the master determination processing (S303) in FIG. 4.

In the step S2005, the CPU 111 compares Info exchange data of the self device, held in the HDD 114 or the ROM 112 thereof, with Info exchange data of the other power transmission device 10, temporarily stored in the RAM 113.

In the step S2006, from results of comparison between the Info exchange data of the self device with the Info exchange data of the other power transmission device 10, the CPU 111 determines which of them has superior capabilities.

If it is determined in the step S2006 that the other power transmission device has superior capabilities to the self device, the CPU 111 sets the self device as the salve in the step S2007.

If it is determined in the step S2006 that the self device has superior capabilities to the other power transmission device, the CPU 111 sets the self device as the master in the step S2008.

As described above, the information included in the Info management information of each power transmission device is exchanged between the power transmission devices. The CPU performance of the other power transmission device is compared with the CPU performance of the self device (step S2005), and if the self device is superior in throughput, the self device is set as the master device of the wireless power feeding system formed by a group of power transmission devices and power transmission devices. This enables the system to efficiently perform processing without reducing the processing speed even when the group has the large number of the power transmission devices and the power transmission devices.

Although in the present embodiment, the description has been given of the processing method in the case where the power transmission devices are compared in the CPU performance 2001, this is not limitative, the power transmission devices may be compared in the compliant standard version, the number of power reception devices that can be managed, or the communicatable distance. In a case where a power transmission device compliant with the latest version of the standard is set as the master device, a new function, an energy-saving effect, etc., can be expected.

Further, in a case where a power transmission device capable of managing a larger number of power reception devices is set as the master device, it is possible to feed power to a larger number of power reception devices than in a case where a power transmission device capable of managing a smaller number of power reception devices is set as the master device.

Further, in a case where a power transmission device having a larger communicatable distance is set as the master device, the number of power transmission devices and power reception devices to and from which information can be transmitted and received is increased, and hence more efficient communication can be expected.

Next, a description will be given of a third embodiment of the present invention. The present embodiment has the same configuration of the power reception device(s) 20 as the first embodiment, but differs from the first embodiment in the configuration of the power transmission device(s) 10, the management information held by the power transmission device 10, and the control method of determining the master device. The following description will be given only of the different points from the first embodiment.

Figure 10:
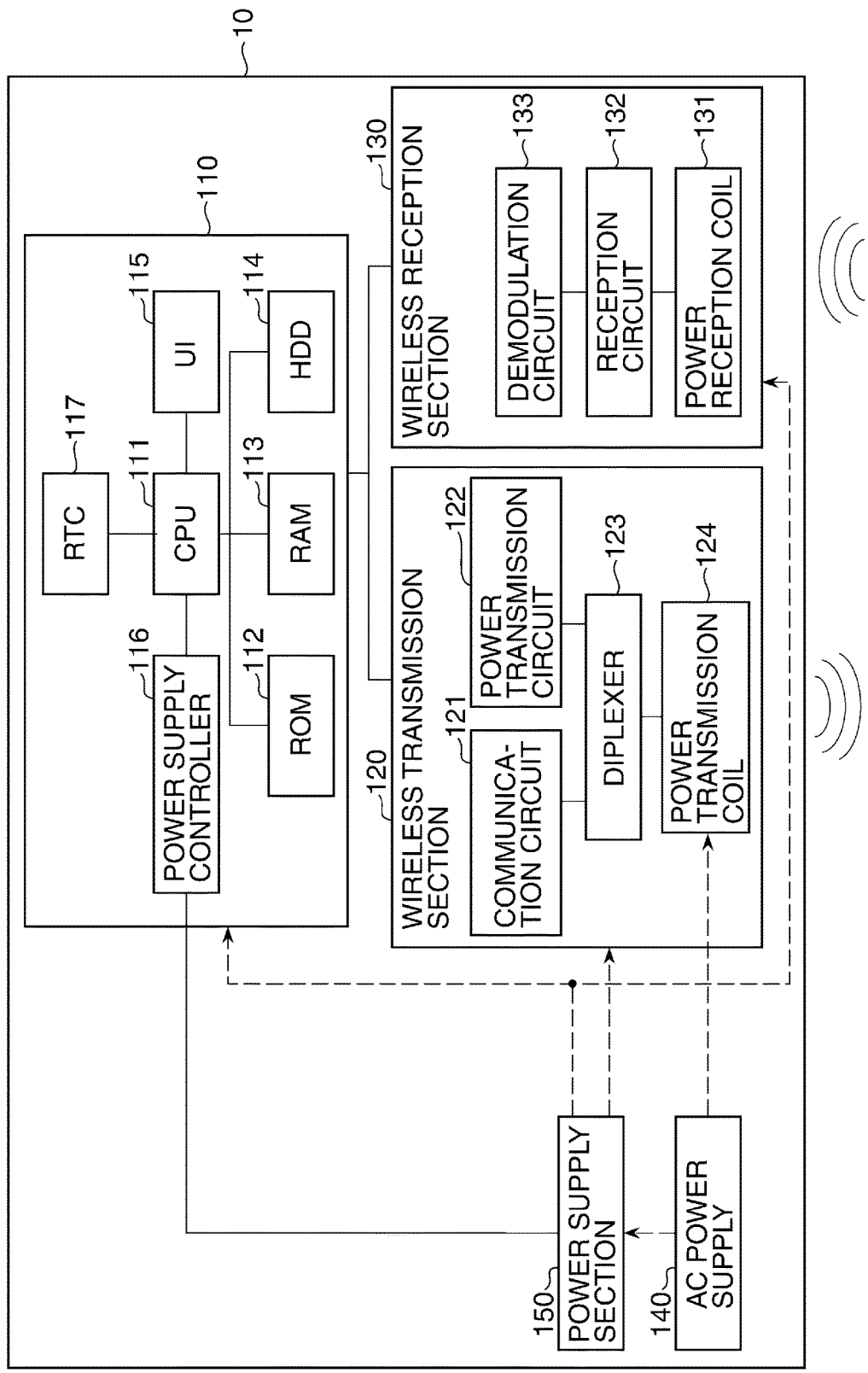
FIG. 10 is a schematic block diagram of a power transmission device of a wireless power transmission system according to a third embodiment of the present invention.

FIG. 10 is a schematic block diagram of the power transmission device 10 according to the third embodiment. Different components of the power transmission device 10 from those of the power transmission device 10 in FIG. 2 in the first embodiment will be described.

The controller 110 includes a RTC 117 as well which has a clock function. The CPU 111 is enabled to acquire time information from the RTC 117 at a predetermined timing, and store the acquired time information in the ROM 112 or the HDD 114 as a time stamp. The predetermined timing in the present embodiment refers to a timing in which the system construction process (S3001) is performed immediately after the power transmission device 10 is powered on.

Figure 11:
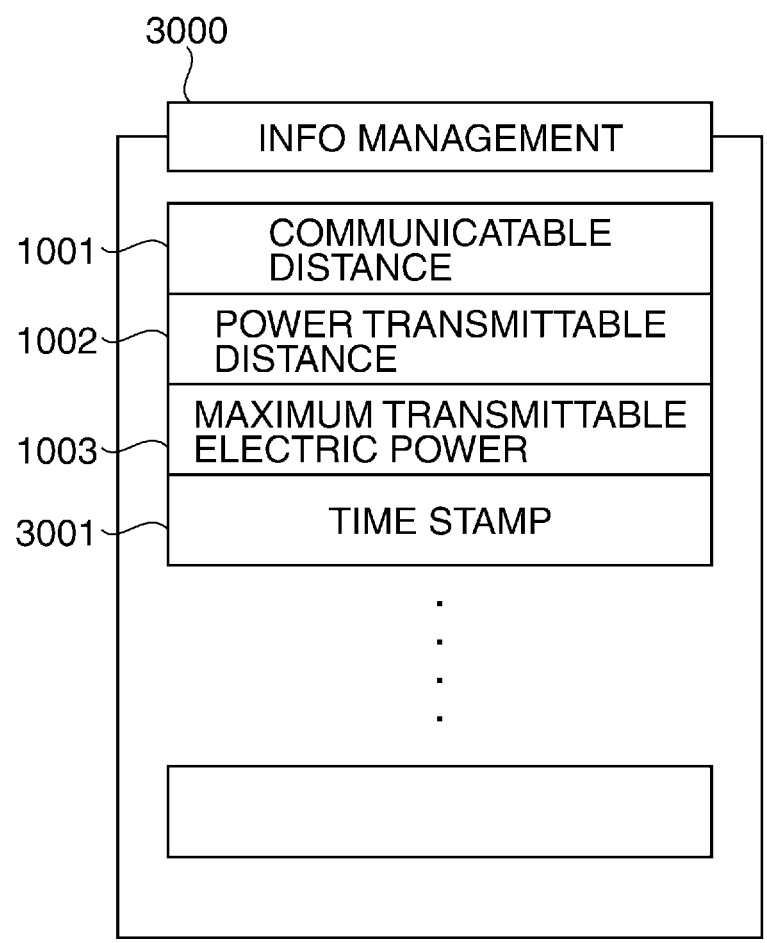
FIG. 11 is a diagram showing details of Info management information in the third embodiment.

FIG. 11 is a diagram showing details of Info management information 3000 used in the third embodiment.

The Info management information 3000 includes not only the communicatable distance 1001, the power transmittable distance 1002, and the maximum transmittable electric power 1003, which have been described in the first embodiment, but also a time stamp 3001.

The time stamp 3001 represents the time information which is acquired by the CPU 111 from the RTC 117 at the predetermined timing.

Figure 12:
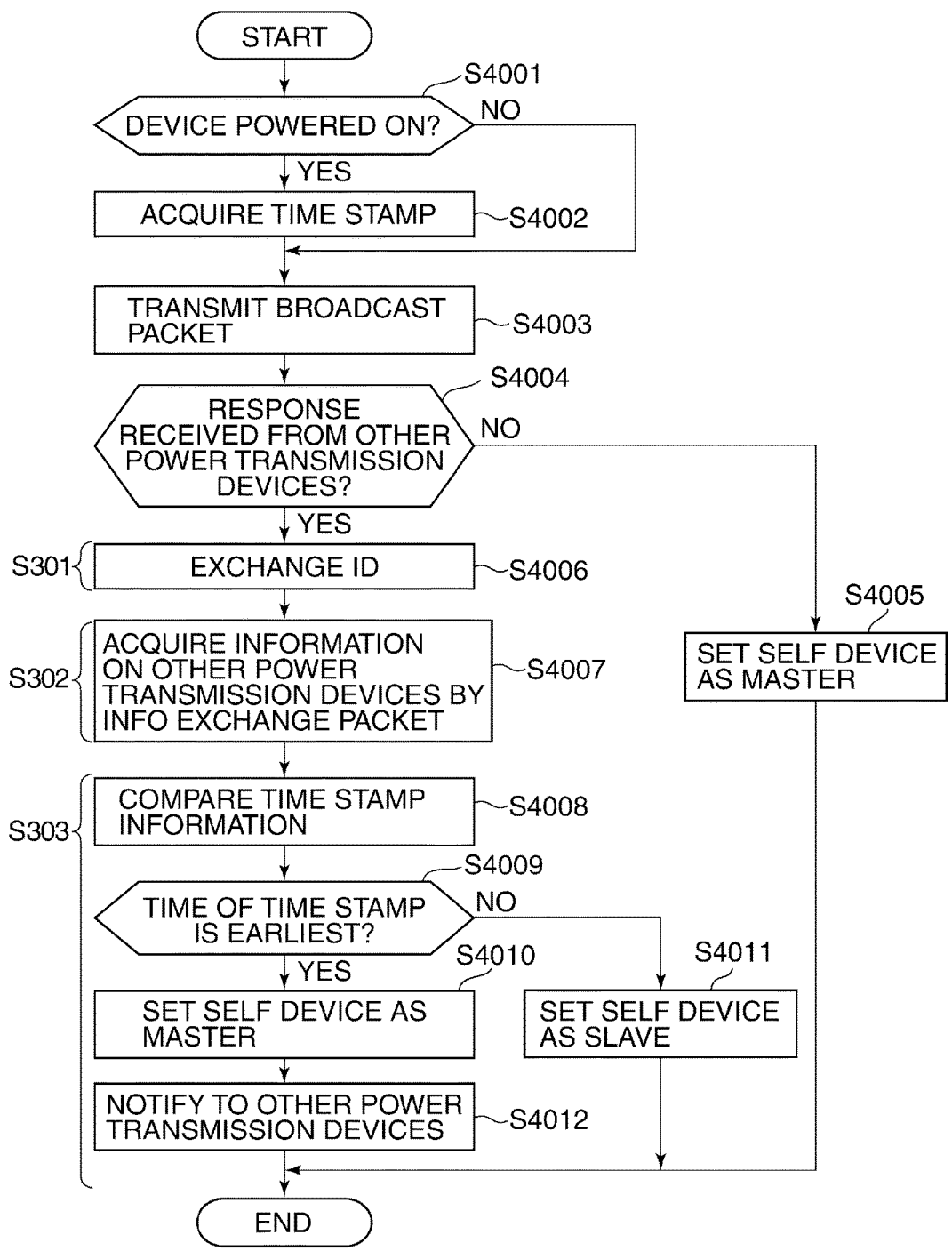
FIG. 12 is a flowchart of the system construction process in FIG. 4 in the third embodiment.

FIG. 12 is a flowchart of the system construction process (S3001) in FIG. 4 in the third embodiment. Although in this process, the description will be given of the control performed by the power transmission device 10b appearing in FIG. 1, by way of example, the same control is performed also by the power transmission devices 10a, 10c, and 10d. Further, the present process is executed by the CPU 111 based on a program stored in the ROM 112 of the power transmission device 10b.

In a step S4001, the CPU 111 determines whether or not the power transmission device 10b has just been powered on.

If it is determined in the step S4001 that the power transmission device 10b has just been powered on, in a step S4002, the CPU 111 of the power transmission device 10b acquires the time information from the RTC 117, and stores the acquired time information in the ROM 112 or the HDD 114 as a time stamp.

In a step S4003, the power transmission device 10b transmits a broadcast packet so as to check whether or not any other power transmission devices (any of the other power transmission devices 10a, 10c, and 10d, in the present example) exist.

In a step S4004, the CPU 111 determines whether or not a response to the broadcast packet transmitted in the step S4003 is received. If no response is received, the CPU 111 judges that there is no other power transmission device 10 in the vicinity of the power transmission device 10b, and proceeds to a step S4005, wherein the CPU 111 sets the self device as the master device. If a response is received, in a step S4006, the CPU 111 exchanges the power transmission device ID (S301) so as to exchange information with the power transmission device(s) 10 having transmitted the response.

After exchanging the power transmission device ID(s), in a step S4007, the CPU 111 performs Info exchange (S302) so as to check specifications of each power transmission device. In this Info exchange (S302), the management information and the specifications of the self device held in the nonvolatile storage device, such as the ROM 112 or the HDD 114, are exchanged.

In the flowchart of the system construction process (S3001) in FIG. 12, steps S4008 to S4012 correspond to the master determination processing (S303) in FIG. 4.

In the step S4008, the CPU 111 compares the time stamp 3001 included in the Info management information 3000 of the power transmission device 10b and a time stamp included in the Info management information 3000 of each of the other power transmission devices 10a and 10c.

In the step S4009, the CPU 111 determines, based on results of comparison in the step S4008, whether or not the self device is earliest in time indicated by the time stamp.

If it is determined in the step S4009 that the self device is earlier in time indicated by the time stamp than any of the other power transmission devices 10a and 10c, in the step S4010, the CPU 111 sets the self device as the master device.

If it is determined in the step S4009 that the other power transmission device 10a or 10c is earlier in time indicated by the time stamp than the self device, in the step S4011, the CPU 111 sets the self device as the slave device.

If the self device is set as the master device in the step S4010, in the step S4012, the CPU 111 notifies the other power transmission devices 10a and 10c of this fact.

As described above, the time stamp 3001 included in the Info management information 3000 of each power transmission device is exchanged between the power transmission devices. Then, the CPU 111 compares the time stamps 3001 of the mating devices with the time stamp 3001 of the self device (step S4008), and a device which is earliest in time indicated by the time stamp is set as the master device of the wireless power feeding system.

Note that the time stamp is acquired only once at the start of power supply. When the process returns from the power transmission process (S3004) to the system construction process (S3001), the time stamp is not acquired, and the time is compared with the other devices using the time stamp acquired at the start of power supply. This makes it possible to always set a device which is powered on earliest as the master device, when constructing the wireless power feeding system.

By setting a device which is powered on earliest as the master device, it is possible to obtain the effect that a device which is newly powered on and added to the system is prevented from being set as the master device. For example, a power transmission device which has constructed the wireless power feeding system with other devices, thereby having been subjected to the series of the sequences from the system construction process (S3001) to the power transmission process (S3004) many times and having repeatedly performed power feeding, already has information on the power reception devices which exist within the power feeding areas. Therefore, by setting such a power transmission device as the master device, it is possible to make the amount of information transferred between the devices smaller than in a case where a power transmission device having been powered on and newly added, is set as the master device, and is required to collect from the beginning information on the power reception devices which exist within the power feeding areas.

Next, a description will be given of a fourth embodiment of the present invention. The present embodiment differs from the first embodiment in that it employs a method of determining a power transmission device to be set as the master device depending on the number of communicatable power transmission devices. The fourth embodiment has the same configurations of the wireless power feeding system, the power transmission device, and the power reception device, and the total sequences of the wireless power feeding system control, as the first embodiment, and hence description thereof is omitted.

Figure 13:
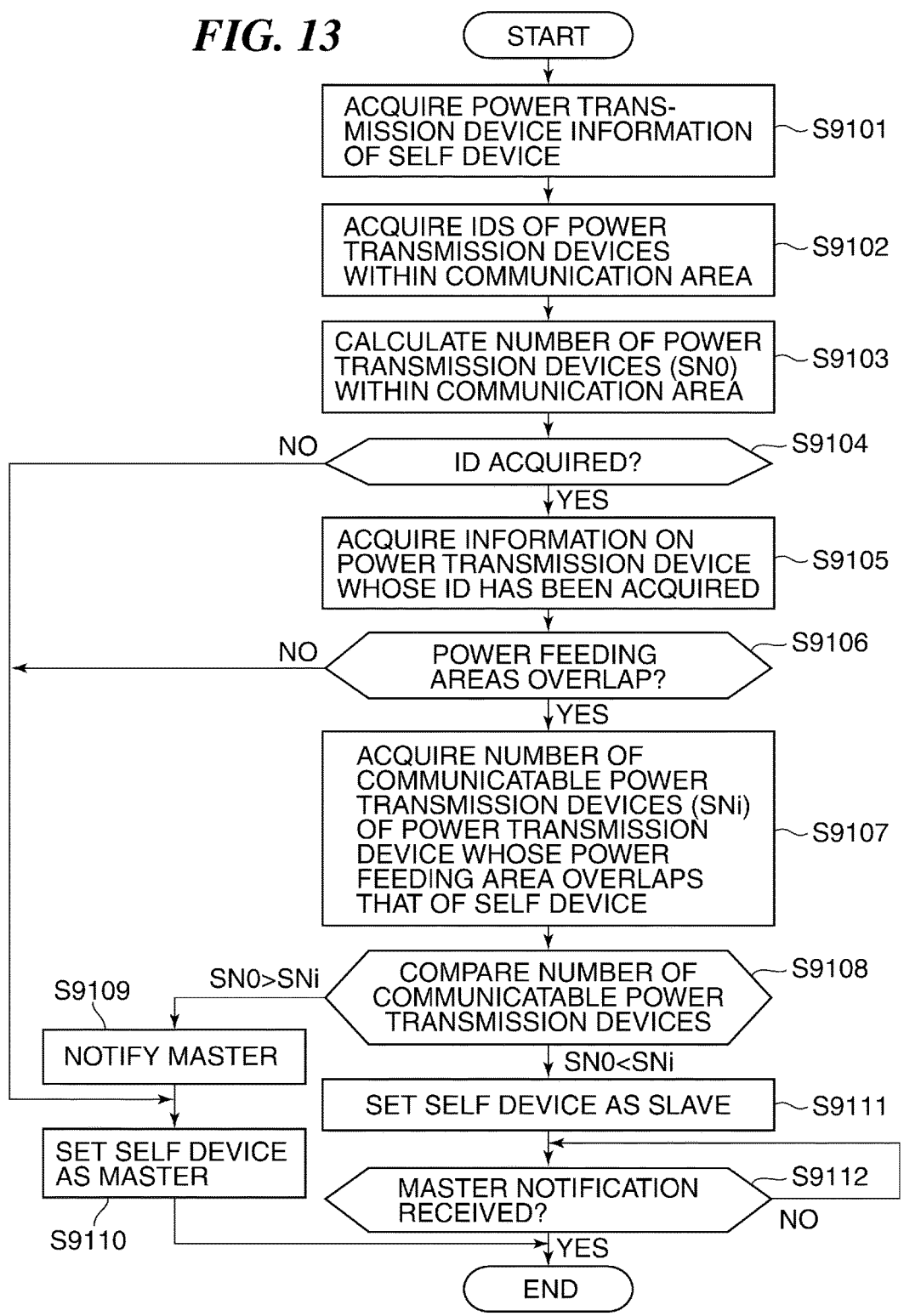
FIG. 13 is a flowchart of the system construction process in FIG. 4 in a fourth embodiment of the present invention.

FIG. 13 is a flowchart of the system construction process (S3001) in FIG. 4 in the fourth embodiment. Although in this process, the description will be given of the control performed by the power transmission device 10b appearing in FIG. 1, by way of example, the system may be configured such that the same control is performed also by the power transmission devices 10a, 10c, and 10d. Further, the present process is executed by the CPU 111 based on a program stored in the ROM 112 in the power transmission device 10b.

In a step S9101, the CPU 111 acquires the location information, the power transmittable distance, and the communicatable distance, as the power transmission device information thereof. In the present embodiment, the CPU 111 loads information which has been set and stored in the HDD 114 of the self device in advance into the RAM 113. As for the location information, the CPU 111 may acquire the location information of the self device by using a measurement unit of the self device.

Next, the CPU 111 acquires the ID information of each of the power transmission devices existing in the communication area using the wireless transmission section 120 and the wireless reception section 130 (step S9102), and calculates the number SN0 of power transmission devices in the communication area (step S9103).

In a step S9104, the CPU 111 determines whether or not the ID information could be acquired in the step S9102, and if the ID information could be acquired, the CPU 111 proceeds to a step S9105, whereas if not, the CPU proceeds to a step S9110.

In the step S9105, the CPU 111 acquires the power transmission device information (the location information, the power transmittable distance, and the communicatable distance) from the power transmission devices whose IDs have been acquired, using the wireless transmission section 120 and the wireless reception section 130, and generates a power transmission device information management table as shown in FIG. 14. A distance Li in FIG. 14 indicates a distance between the power transmission device 10b and each power transmission device, and is calculated, based on the location information of the self device acquired in the step S9101 in FIG. 13 and the location information in the power transmission device information acquired in the step S9105 in FIG. 13, by using the following equation (1):

$$Li = \sqrt{(xi-x0)^2 + (yi-y0)^2 + (zi-z0)^2} \quad (1)$$

In FIG. 13, in a step S9106, the CPU 111 determines whether or not the power feeding areas overlap, by subtracting the power transmittable distance of the self device and the power transmittable distance of each target power transmission device from the device-to-device distance Li calculated in the step S9105. If a value obtained by the subtraction is a negative value, the CPU 111 judges that the power feeding areas overlap, and by performing the judgment on each of the target power transmission devices, the CPU 111 acquires the number SNi of communicatable power transmission devices for each of the power transmission devices whose power feeding areas overlap to thereby create a power transmission device count management table shown in FIG. 15 (step S9107).

Next, in a step S9108, the CPU 111 compares the number SN0 of power transmission devices within the communication area of its own and the number SNi of power transmission devices which can communicate with each power transmission device whose ID has been acquired. Then, if the number SN0 of power transmission devices within the communication area of its own is larger than the number SNi of power transmission devices which can communicate with each power transmission device whose ID has been acquired, the CPU 111 notifies the power transmission devices that the self device is set as the master device (step S9109). Further, the CPU 111 sets a flag in the RAM 113 such that the self device behaves as the master in the subsequent processes (step S9110).

If it is determined in the step S9108 that the number SN0 of power transmission devices within the communication area of its own is smaller than the number SNi of power transmission devices which can communicate with each power transmission device whose ID has been acquired, the CPU 111 sets a flag in the RAM 113 such that the self device behaves as a slave device (step S9111). Then, upon receipt of a notification from the power transmission device set as the master device (YES to a step S9112), the CPU 111 terminates the present process.

If it is determined in the step S9108 that the number SN0 of power transmission devices within the communication area of its own is equal to the number SNi of power transmission devices which can communicate with each power transmission device whose ID has been acquired, the master device may be determined using any of the methods of determining a master power transmission device used in the other embodiments.

Further, if no ID information of power transmission devices could be acquired in the step S9104, or if a value obtained by the subtraction is a positive value in the step S9106, i.e. if it is determined that there are no power feeding areas overlapping the power feeding area of the self device, the CPU 111 proceeds to the step S9110. Then, the CPU 111 sets a flag in the RAM 113 such that the self device behaves as the master.

Next, a description will be given of a fifth embodiment of the present invention. The present embodiment differs from the first embodiment in that it employs a method of determining a power transmission device to be set as the master device depending on the magnitude of the communicatable distance. In the fifth embodiment, the description will be given of the configurations of the wireless power feeding system, the total sequences of the wireless power feeding system control, and the method of determining a master power transmission device. The fifth embodiment has the same configurations of the power transmission device and the power reception device as the first embodiment, and hence description thereof is omitted.

Figure 16:
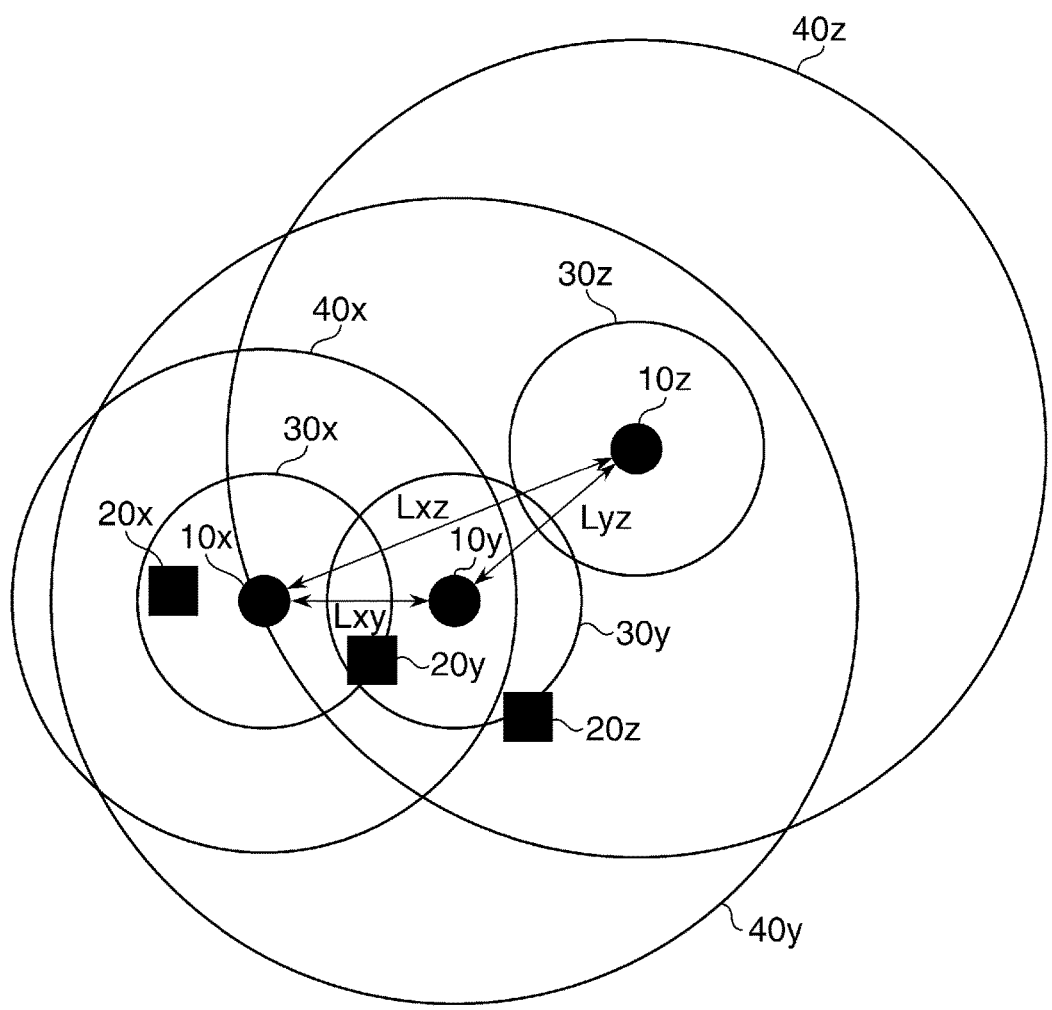
FIG. 16 is a conceptual diagram of a wireless power feeding system according to a fifth embodiment of the present invention.

FIG. 16 is a conceptual diagram of the wireless power feeding system according to the fifth embodiment.

The power transmission devices, denoted by reference numerals 10x, 10y, and 10z, wirelessly feed electric power to the power reception devices, denoted by reference numerals 20x, 20y, and 20z. Further, the power transmission devices 10x, 10y, and 10z each perform data communication required for feeding power with the power reception devices 20x, 20y, and 20z which exist within a communicatable area.

The power reception devices 20x, 20y, and 20z wirelessly receive electric power fed from the power transmission devices 10x, 10y, and 10z. Further, the power reception devices 20x, 20y, and 20z each perform data communication required for receiving fed power with the power transmission devices 10x, 10y, and 10z which exist within a communicatable area.

The power feeding areas, denoted by reference numerals 30x, 30y, and 30z, indicate areas in which power feeding from the power transmission devices 10x, 10y, and 10z to the power reception devices can be performed, respectively.

The communication areas, denoted by reference numerals 40x, 40y, and 40z, indicate areas in which data communication can be performed by the power transmission devices 10x, 10y, and 10z, respectively.

The power feeding areas 30x to 30z and the communication areas 40x to 40z of the power transmission devices 10x to 10z have a relationship in which the communication areas 40x to 40z are wider than the power feeding areas 30x to 30z, respectively, and the power feeding area of each device is completely included in the communication area of the same. Further, in the present embodiment, the communication area 40y of the power transmission device 10y is wide, and the power feeding areas of the other power transmission devices are accommodated in the communication area 40y.

As indicated by a relationship between the power transmission devices 10x and 10y (or the power transmission devices 10y and 10z) shown in FIG. 16, in a case where the power feeding areas overlap, a group is formed by these devices, and one of the devices is set as a master device. The power transmission device set as the master device determines which of the power transmission devices is to feed electric power to a power reception device existing in the power feeding areas of the group.

Figure 17:
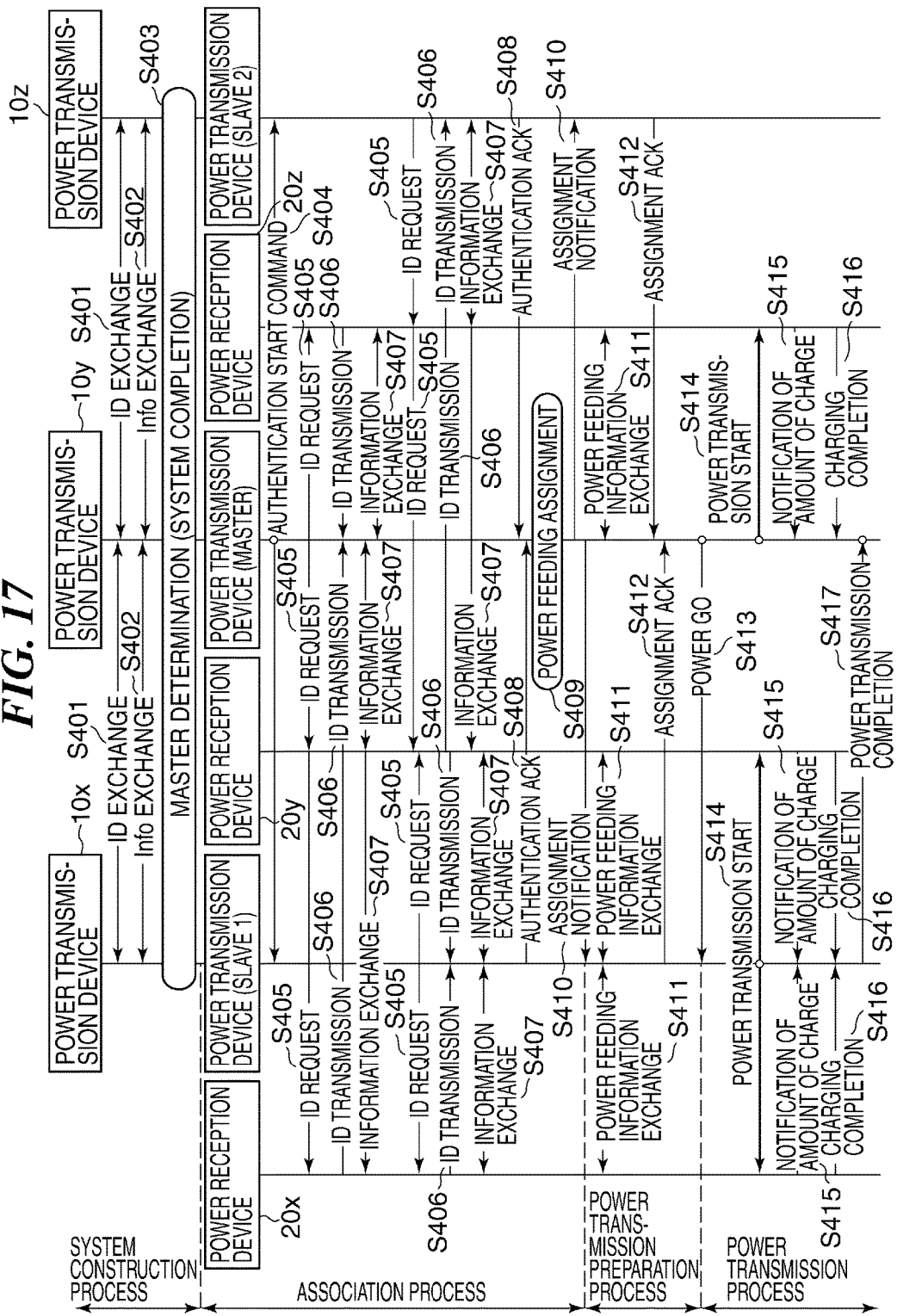
FIG. 17 is a sequence diagram of the whole wireless power feeding system in the fifth embodiment.

FIG. 17 is a sequence diagram of the total sequences of the N-to-N wireless power feeding system in the fifth embodiment. By performing the following sequences, data communication for wireless power feeding is realized in which a plurality of power transmission devices transmit electric power to a plurality of power reception devices. In the present sequence, the control will be described taking the system configuration shown in FIG. 16 as an example.

In the system construction process, whether or not to form a group between the power transmission devices is determined, and the master device of the system is determined.

First, in a step S401, the power transmission devices exchange information on the transmission device ID with each other. Each power transmission device transmits a request for transmitting the power transmission device ID to the other power transmission devices existing in the communication area of the self device. The step S401 is the same as the step S301 in FIG. 4.

Next, in a step S402, the power transmission devices exchange the power transmission device information (the location information, the communicatable distance, and the power transmittable distance). Each power transmission device transmits a request for transmitting the power transmission device information to the other power transmission devices whose IDs have been received in the step S401. The step S402 is the same as the step S302 in FIG. 4.

In a step S403, a power transmission device to be set as the master device is determined using the information exchanged in the steps S401 and S402. In the present sequence, the description will be given of a case where the power transmission device 10y is determined as the master device, and the power transmission devices 10x and 10z are determined as the slave devices.

Thus, the system construction between the power transmission devices is completed. Thereafter, the power transmission devices and the power reception devices are associated with each other in a step S404 et seq.

In the association process, the power transmission device and the power reception device are associated with each other according to the following two steps.

The first step is an authentication operation for identifying the presence of a power reception device in any of the respective communication areas of the power transmission devices 10x to 10z. The second step is an assignment operation in which the power transmission device 10y as the master notifies the power transmission devices 10x and 10z, as the slaves, of assignment of the power reception devices 20x to 20z for which power transmission is to be performed, based on results of authentication of each power transmission device. These steps will be described in detail hereafter.

In the step S404, the power transmission device 10y as the master issues an authentication start command to the power transmission devices 10x and 10z as the slaves. The authentication operation between the power transmission devices and the power reception devices is executed in steps S405 to S407.

In the step S405, the power transmission devices 10x to 10z each issue a device ID request by broadcast transmission so as to check whether or not a power reception device exists within the communication area of the self device. In the present embodiment, the power reception devices 20x, 20y, and 20z existing in the communication area of the power transmission device 10y as the master receive the request from the power transmission device 10y. Further, the power reception devices 20x and 20y existing in the communication area of the power transmission device 10x as the slave receive the request from the power transmission device 10x as the slave. Similarly, the power reception devices 20y and 20z existing in the communication area of the power transmission device 10z as the slave receive the request from the power transmission device 10z.

In the step S406, each power reception device transmits the device ID information to each power transmission device from which the request has been received. In the present embodiment, the power reception device 20x transmits the device ID to the power transmission devices 10x and 10y. Further, the power reception device 20y transmits the device ID to the power transmission devices 10x, 10y, and 10z. Similarly, the power reception device 20z transmits the device ID to the power transmission devices 10y and 10z.

In the step S407, the power transmission devices 10x to 10z each checks location information of each power reception device whose ID has been received in the step S406 and a frequency required for power reception by the same, and exchange information on the results of checking. The location information of the power reception device may be determined based on a result of training of electric power transmission from each power transmission device to each power reception device, or may be determined based on a result of detection from a location sensor (not shown).

In a step S408, when the power transmission devices 10x and 10z as slave devices each have finished information exchange with power reception devices existing in the communication area of the self device, they each transmit the completion notification to the power transmission device 10y as the master together with the acquired information to thereby terminate the authentication step.

In a step S409, the power transmission device 10y as the master executes the assignment operation for determining which of the power transmission devices is to transmit electric power to which of the power reception devices based on the results of authentication on the power reception devices with which the self device can communicate, and the power reception devices with which the power transmission devices 10x and 10z as the slaves can communicate. In the present embodiment, it is assumed that the power transmission device 10y as the master determines that the power reception device 20y existing in an area where the power feeding areas overlap is assigned to the power transmission device 10x. That is, the following description will be given assuming that the power transmission device 10y has determined that the power transmission device 10x is to transmit power to the power reception devices 20x and 20y, and the power transmission device 10y is to transmit power to the power reception device 20z. The association process is thus completed.

After completing the association process, the process shifts to the power transmission preparation process. In the power transmission preparation process, various settings for transmitting electric power between each power transmission device and each power reception device are made based on the determined assignment of power transmission between the power transmission devices. The various settings include, for example, the device ID of a power feeding destination, the power transmission device ID of a power feeding source, power feeding frequency, and remaining power information of a power receiving device. The power transmission preparation process will be described next.

In a step S410, the power transmission device 10y as the master executes assignment notification for notifying each of the power transmission devices 10x and 10z, as the slaves, of the device ID of each power reception device to which power transmission is to be executed. Note that the power transmission device 10y as the master notifies the power transmission device 10z of no assignment of a power reception device to which power transmission is to be executed.

In a step S411, the power transmission device 10x as the slave exchanges power feeding information required for feeding electric power with the power reception device designated by the power transmission device 10y as the master.

When the power feeding information has been exchanged, in a step S412, the power transmission devices 10x and 10z as the slaves each send an assignment ACK which indicates completion of preparation of power transmission to the assigned power reception device, to the power transmission device 10y as the master. When the assignment ACK has been sent from all of the power transmission devices 10x and 10z as the slaves to the power transmission device 10y as the master, the power transmission preparation process is completed. The power transmission process is started from the next step S413.

In the step S413, the power transmission device 10y as the master instructs the power transmission device 10x as the slave to start power transmission (power feeding) to the power reception devices. Note that the power transmission device 10z has no power reception device assigned thereto, and hence the power transmission start command is not transmitted to the power transmission device 10z.

In a step S414, wireless power feeding from the power transmission devices 10x and 10y to the power reception devices 20x to 20c is started. During the power transmission period, the amount of charge is periodically notified from the power reception devices 20x to 20c which are receiving electric power, to the power transmission devices 10x and 10y which are the power supply sources, in a step S415. Then, in a step S416, when the power reception devices 20x to 20c are fully charged, the power reception devices 20x to 20c notify the power transmission devices 10x and 10y, as the power supply sources, of completion of charging. Then, since each power transmission device as the slave has completed power feeding to the power reception device assigned thereto, it notifies the power transmission device 10y, as the master, of termination of power transmission.

In a step S417, the power transmission device 10y as the master receives notification of completion of charging from the assigned power reception device 20z and notification of termination of power transmission from the power transmission device 10x as the slave, whereby the power transmission process is terminated, and then the process shifts to the association process again.

Figure 18:
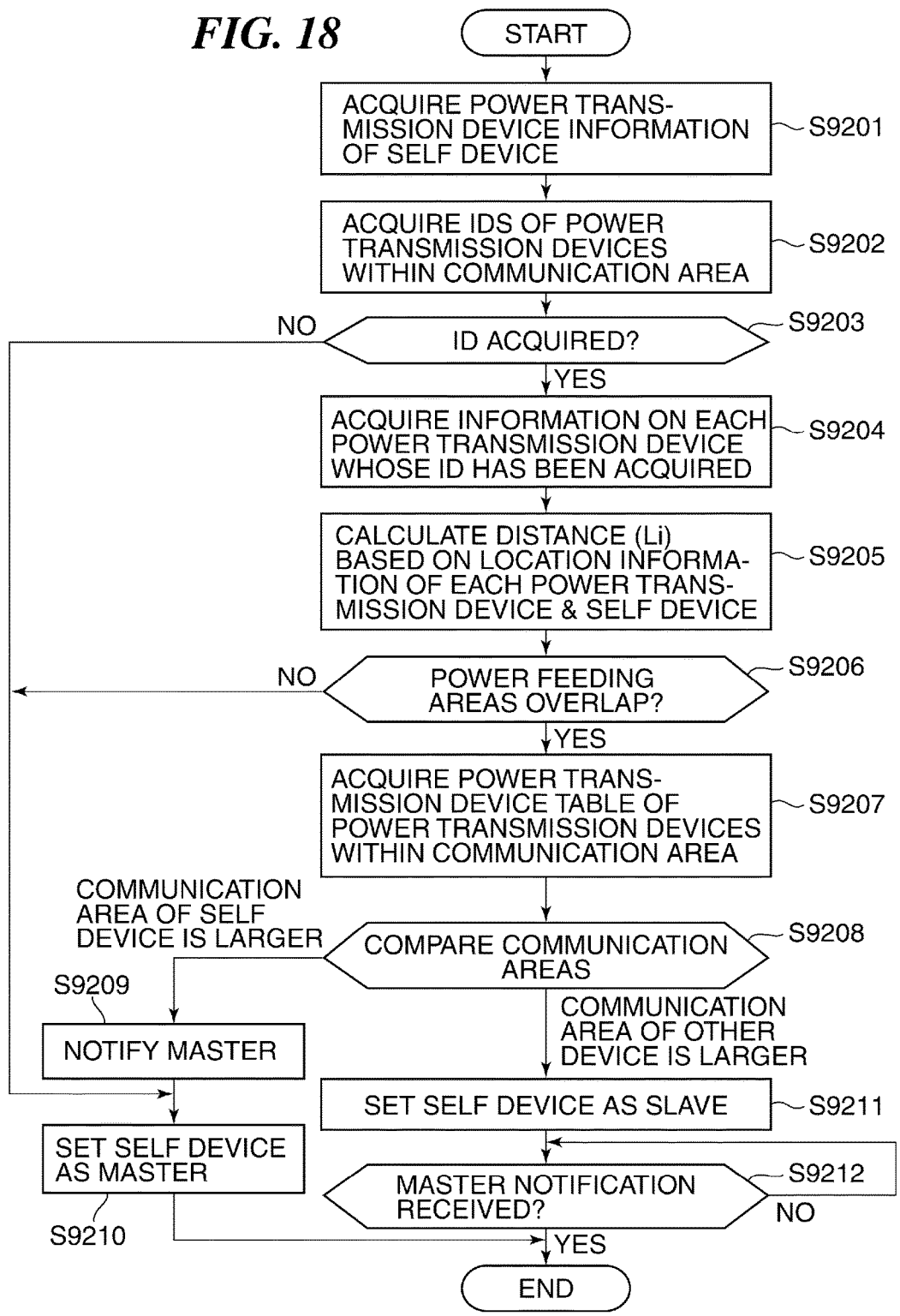
FIG. 18 is a flowchart of an essential part of the system construction process in FIG. 17 in the fifth embodiment.

FIG. 18 is a flowchart of the system construction process in FIG. 17 in the fifth embodiment. Although in this process, the description will be given of the control performed by the power transmission device 10y appearing in FIG. 18 by way of example, the system may be configured such that the same control is performed by the power transmission devices 10a and 10c. Further, the present process is executed by the CPU 111 based on a program stored in the ROM 112 of the power transmission device 10y.

In a step S9201, the CPU 111 acquires the location information, power transmittable distance, and communicatable distance of the self device, as the power transmission device information of its own. In the present embodiment, the CPU 111 loads information set and stored in the HDD 114 thereof in advance into the RAM 113. As for the location information, the CPU 111 may acquire location information of the self device by using a measurement unit of the self device.

Next, the CPU 111 acquires the ID information of each power transmission device existing in the communication area, using the wireless transmission section 120 and the wireless reception section 130 (step S9202). If the ID information has been acquired in the step S9202 (YES to a step S9203), the CPU 111 acquires the power transmission device information (the location information, the power feeding area information, and the communication area information) from each power transmission device whose ID has been acquired, using the wireless transmission section 120 and the wireless reception section 130, and generates a power transmission device information management table as shown in FIG. 19 (step S9204). The distance Li in FIG. 19 indicates a distance between the power transmission device 10y and each power transmission device, and is calculated using the above equation (1) based on the location information of the self device acquired in the step S9201 and the location information in the power transmission device information acquired in the step S9204 (step S9205).

In FIG. 18, in a step S9206, the CPU 111 determines whether or not the power feeding areas overlap, by subtracting the power transmittable distance of the self device and the power transmittable distance of each target power transmission device from the device-to-device distance Li calculated in the step S9204. If a value obtained by the subtraction is a negative value, the CPU 111 judges that the power feeding areas overlap, and requests each power transmission device existing in the communication area to send the power transmission device information management table shown in FIG. 19 to acquire the same (step S9207).

Next, the CPU 111 compares the size of the communication area of each device based on the power transmission device information management table acquired in the step S9207 (step S9208). At this time, instead of simply comparing the size of the communication area, the CPU 111 may perform comparison of communication areas by determining whether or not all power feeding areas of the devices in the group are accommodated within the communication area of each device. Specifically, the CPU 111 determines whether or not the size (radius) of the communication area, i.e. the communicatable distance, of the self device is larger than the sum of the distance Li to each power transmission apparatus and the size (radius) of the power feeding area, i.e. the power transmittable distance, of the power transmission apparatus.

If it is determined in the step S9208 that the communication area of the self device is larger, i.e. the self device is more advantageous, the CPU 111 notifies each power transmission device that the self device is set as the master device (step S9209). Then, the CPU 111 sets a flag in the RAM 113 such that the self device behaves as the master in the subsequent processes (step S9210).

On the other hand, if it is determined in the step S9208 that the communication area of a device other than the self device is larger, the CPU 111 sets a flag in the RAM 113 such that the self device behaves as a slave in the subsequent processes (step S9211). Then, upon receipt of a notification from the other device set as the master device (YES to a step S9212), the CPU 111 terminates the present process.

Note that if it is determined in the step S9208 that the communication area of a device other than the self device is equal to the communication area of the self device, the master device may be determined using the methods of determining a master power transmission device used in the other embodiments.

Further, if no ID information of power transmission devices could be acquired in the step S9203, or if all the results of subtractions indicate positive values in the step S9206, and hence it is judged in this step that there are no power feeding areas overlapping the power feeding area of the self device, the CPU 111 proceeds to the step S9210. Then, the CPU 111 sets a flag in the RAM 113 such that the self device behaves as the master.

Next, a description will be given of a sixth embodiment of the present invention. The present embodiment differs from the first embodiment in that it employs a method of determining a power transmission device to be set as the master device depending on the number of communicatable power transmission devices. In the sixth embodiment, the description will be given only of the method of determining a master power transmission device. The sixth embodiment has the same configurations of the wireless power feeding system, the power transmission device, and the power reception device and the same total sequences of the wireless power feeding system control as the first embodiment, and hence description thereof is omitted.

Figure 20:
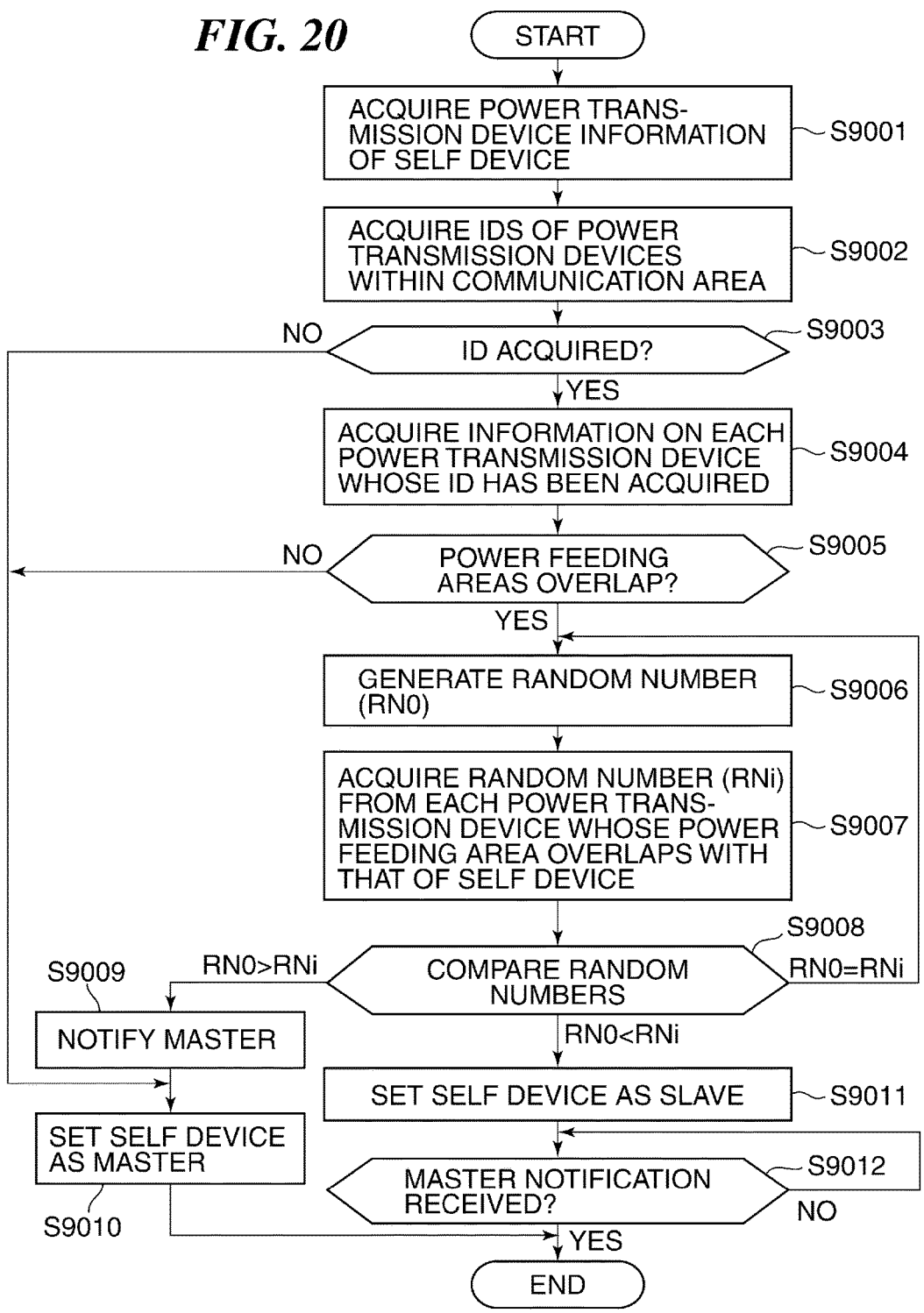
FIG. 20 is a flowchart of an essential part of the system construction process in FIG. 4 in a sixth embodiment of the present invention.

FIG. 20 is a flowchart of the system construction process in FIG. 4 in the sixth embodiment. Although in this process, the description will be given of the control performed by the power transmission device 10b appearing in FIG. 1 by way of example, the system may be configured such that the same control is performed by the power transmission devices 10a and 10c. Further, the present process is executed by the CPU 111 based on a program stored in the ROM 112 of the power transmission device 10b.

In a step S9001, the CPU 111 acquires the location information, the power transmittable distance, and the communicatable distance, as the power transmission device information of the self device. In the present embodiment, the CPU 111 loads information set and stored in the HDD 114 of the device in advance into the RAM 113. As for the location information, the CPU 111 may acquire the location information of the self device by using a measurement unit of the self device.

Next, the CPU 111 acquires the ID information of the power transmission devices existing in the communication area, using the wireless transmission section 120 and the wireless reception section 130 (step S9002). If the ID information has been acquired in the step S9002 (YES to a step S9003), the CPU 111 acquires the power transmission device information (the location information, the power transmittable distance, and the communicatable distance) from the power transmission devices whose IDs have been acquired, using the wireless transmission section 120 and the wireless reception section 130, and generates the power transmission device information management table as shown in FIG. 14 (step S9004). The distance Li in FIG. 14 indicates a distance between the power transmission device 10b and each power transmission device, and is calculated using the above equation (1) based on the location information of the self device acquired in the step S9001 and the location information in the power transmission device information acquired in the step S9004.

Figure 21:
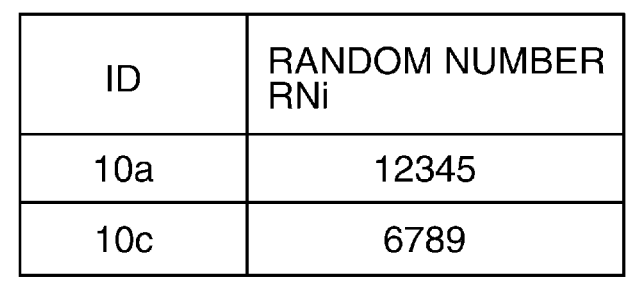

In FIG. 20, in a step S9005, the CPU 111 determines whether or not the power feeding areas overlap by subtracting the power transmittable distance of the self device and the power transmittable distance of a target power transmission device from the device-to-device distance Li calculated in the step S9004. If a value obtained by the subtraction is a negative value, the CPU 111 judges that the power feeding areas overlap, and generates a random number RN0 (step S9006). Then, the CPU 111 acquires a random number RNi from each power transmission device whose power feeding area overlaps that of the self device, using the wireless transmission section 120 and the wireless reception section 130, and generates a power transmission device random number management table as shown in FIG. 21 (step S9007). Then, the CPU 111 compares the random number RN0 generated by the self device and the acquired random number RNi (step S9008).

If it is determined in the step S9008 that the random number RN0 generated by the self device is larger than the acquired random number RNi, the CPU 111 notifies each power transmission device that the self device is set as the master power transmission device (step S9009). Then, the CPU 111 sets a flag in the RAM 113 such that the self device behaves as the master in the subsequent processes (step S9010).

On the other hand, if it is determined in the step S9008 that the random number RN0 generated by the self device is smaller than the acquired random number RNi, the CPU 111 sets a flag in the RAM 113 such that the self device behaves as a slave in the subsequent processes (step S9011). Then, upon receipt of a notification from the power transmission device set as the master (step S9012), the CPU 111 terminates the present process.

Note that if it is determined in the step S9008 that the random number RN0 generated by the self device is equal to the acquired random number RNi, the CPU 111 returns to the step S9006 again.

Further, no ID information of power transmission devices could be acquired in the step S9003, or if all the results of subtractions indicate positive values in the step S9005, and hence it is judged in this step that there are no power feeding areas overlapping the power feeding area of the self device, the CPU 111 proceeds to the step S9010. Then, the CPU 111 sets a flag in the RAM 113 such that the self device behaves as the master.

According to the above-described first to sixth embodiments, in a case where a plurality of power transmission devices are disposed in the wireless power feeding system, it is possible to determine the master-slave relationship between the power transmission devices by setting one power transmission device as the master. Further, by defining such a master device, the master device becomes capable of assigning feeding of power to power reception devices to slave devices following the master device. The capability of assigning feeding of power to power reception devices to slave devices makes it possible, for example, to transmit electric power to a power reception device existing in an area where associated power feeding areas overlap, while preventing interference of wireless transmission between the power transmission devices. In other words, by defining the master device, even when the plurality of power transmission devices are disposed within a distance in which the plurality of power transmission devices can interfere with each other, the power transmission device set as the master becomes capable of determining assignment of feeding of power to power reception apparatuses to the other power transmission devices, whereby it is possible to efficiently feed electric power without interference.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST 10a, 10b, 10c, 10d power transmission device
20a, 20b, 20c, 20d power reception device
30a, 30b, 30c, 30d power feeding area
40a, 40b, 40c, 40d communication area
110 controller
111 CPU
112 ROM
114 HDD
120 wireless transmission section
130 wireless reception section

The invention claimed is:

1. A wireless power feeding system for supplying electric power to a power reception device, in which a power transmission device and at least one other power transmission device that transmit electric power form a group in cooperation with each other,
   wherein the power transmission device comprises:
      a power transmission unit configured to transmit electric power to the power reception device;
      a communication unit configured to perform communication with the power reception device and the at least one other power transmission device; and
      at least one processor that functions as:
      a calculation unit configured to calculate a number of communicatable power transmission devices, using said communication unit;
      an acquisition unit configured to acquire a number of communicatable power transmission devices from each communicatable one of the at least one other power transmission device, using said communication unit;
      a comparison unit configured to compare the number of communicatable power transmission devices, which is calculated by said calculation unit, and the number of communicatable power transmission devices of each communicatable one of the at least one other power transmission device, which is acquired by said acquisition unit; and
      a determination unit configured to determine the power transmission device as a master device of the group, in a case where a result of comparison by said comparison unit indicates that the number of communicatable power transmission devices, which is calculated by said calculation unit, is larger than the number of communicatable power transmission devices of each communicatable one of the at least one other power transmission device, which is acquired by said acquisition unit.

2. The wireless power feeding system according to claim 1, wherein in a case where communication with none of the at least one other power transmission device can be performed by said communication unit, said determination unit determines the power transmission device as the master device.

3. A method of controlling a wireless power feeding system for supplying electric power to a power reception device, in which a power transmission device and at least one other power transmission device that transmit electric power form a group in cooperation with each other, the method being implemented by the power transmission device and comprising:
   transmitting electric power from the power transmission device to the power reception device;

performing communication with the power reception device and the at least one other power transmission device;

calculating a number of communicatable power transmission devices, using said communication;

acquiring a number of communicatable power transmission devices from each communicatable one of the at least one other power transmission device, using said communication;

comparing the number of communicatable power transmission devices, which is calculated by said calculating, and the number of communicatable power transmission devices of each communicatable one of the at least one other power transmission device, which is acquired by said acquiring; and determining the power transmission device as a master device of the group, in a case where a result of said comparing indicates that the number of communicatable power transmission devices, which is calculated by said calculating, is larger than the number of communicatable power transmission devices of each communicatable one of the at least one other power transmission device, which is acquired by said acquiring.

* * * * *